(12) United States Patent
Banerjee et al.

(10) Patent No.: US 11,501,495 B2
(45) Date of Patent: Nov. 15, 2022

(54) VIRTUAL MODELS FOR COMMUNICATIONS BETWEEN AUTONOMOUS VEHICLES AND EXTERNAL OBSERVERS

(71) Applicant: QUALCOMM Incorporated, San Diego, CA (US)

(72) Inventors: Debdeep Banerjee, San Diego, CA (US); Ananthapadmanabhan Arasanipalai Kandhadai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 16/864,016

(22) Filed: Apr. 30, 2020

(65) Prior Publication Data

US 2020/0357174 A1  Nov. 12, 2020

Related U.S. Application Data

(60) Provisional application No. 62/846,445, filed on May 10, 2019.

(51) Int. Cl.
*G06T 19/00* (2011.01)
*G06F 3/01* (2006.01)
(Continued)

(52) U.S. Cl.
CPC .............. *G06T 19/00* (2013.01); *G06F 3/013* (2013.01); *G06F 3/017* (2013.01); *G06V 10/40* (2022.01); *G06V 40/20* (2022.01); *G09C 1/00* (2013.01)

(58) Field of Classification Search
CPC ........ G02B 27/0172; G02B 2027/0138; G02B 2027/0178; G06F 3/011; G06F 3/0304;
(Continued)

(56) References Cited

U.S. PATENT DOCUMENTS 8,954,252 B1 * 2/2015 Urmson ................. G08G 1/166
701/301
9,064,420 B2   6/2015 Beckwith et al.
(Continued)

OTHER PUBLICATIONS

International Search Report and Written Opinion—PCT/US2020/031361—ISA/EPO—dated Sep. 22, 2020.

*Primary Examiner* — Nelson M Rosario
(74) *Attorney, Agent, or Firm* — Polsinelli LLP

(57) ABSTRACT

Systems and methods for interactions between an autonomous vehicle and one or more external observers include virtual models of drivers the autonomous vehicle. The virtual models may be generated by the autonomous vehicle and displayed to one or more external observers, and in some cases using devices worn by the external observers. The virtual models may facilitate interactions between the external observers and the autonomous vehicle using gestures or other visual cues. The virtual models may be encrypted with characteristics of an external observer, such as the external observer's face image, iris, or other representative features. Multiple virtual models for multiple external observers may be simultaneously used for multiple communications while preventing interference due to possible overlap of the multiple virtual models.

14 Claims, 13 Drawing Sheets

(51) Int. Cl.
*G09C 1/00* (2006.01)
*G06V 10/40* (2022.01)
*G06V 40/20* (2022.01)

(58) Field of Classification Search
CPC ..... G06F 3/14; G06F 3/017; G06K 19/06037; G06V 40/1365; H04L 63/0428; H04L 9/32; H04L 9/3231; H04N 21/40; H04N 21/4405; H04N 21/414; H04N 21/4223; H04N 21/44008; H04N 21/858; B60Q 1/26; B60Q 1/50; B60Q 5/005; B60Q 2400/50; G05D 1/0088; G06T 13/80; G06T 2200/24
See application file for complete search history.

(56) References Cited

U.S. PATENT DOCUMENTS

| | | |
|---|---|---|
| 9,475,422 B2 | 10/2016 | Hillis et al. |
| 9,855,890 B2 | 1/2018 | James et al. |
| 2014/0299660 A1 | 10/2014 | Melzer |
| 2015/0077327 A1 | 3/2015 | Pisz et al. |
| 2015/0336502 A1* | 11/2015 | Hillis ................ B60Q 1/26 701/23 |
| 2017/0240096 A1 | 8/2017 | Ross et al. |
| 2018/0204370 A1 | 7/2018 | Wilson |

\* cited by examiner

VIRTUAL MODELS FOR COMMUNICATIONS BETWEEN AUTONOMOUS VEHICLES AND EXTERNAL OBSERVERS

CROSS-REFERENCES TO RELATED APPLICATIONS

This application claims the benefit of U.S. Provisional Application No. 62/846,445, filed on May 10, 2019, which is hereby incorporated by reference, in its entirety and for all purposes.

FIELD

This application relates communications between autonomous vehicles and external observers. For example, aspects of the application are directed to virtual models of drivers used for communications between an autonomous vehicle and one or more pedestrians.

BACKGROUND

Avoiding accidents and fostering safe driving ambience are important goals of operating autonomous vehicles while pedestrians and/or other external observers are present. In situations involving conventional vehicles with human drivers, real-time interactions between the human drivers and the external observers may help with reducing unsafe traffic conditions. However, the lack of a human driver in autonomous vehicles may pose challenges to such interactions.

SUMMARY

In some examples, techniques and systems are described for generating virtual models that depict virtual drivers for autonomous vehicles. A virtual model generated using the techniques described herein allows interactions between an autonomous vehicle and one or more external observers including pedestrians and/or other passengers and/or drivers of other vehicles other than the autonomous vehicle. A virtual model can include an augmented reality and/or virtual reality three-dimensional (3D) model of a virtual driver (e.g., a hologram, an anthropomorphic, humanoid, or human-like rendition of a driver) of the autonomous vehicle.

In some examples, a virtual model can be generated by an autonomous vehicle. In some examples, a virtual model can be generated by a server or other remote device in communication with an autonomous vehicle, and the autonomous vehicle can receive the virtual model from the server or other remote device. In some examples, one or more virtual models may be displayed within or on a part (e.g., a windshield, a display, and/or other part of the vehicle) of the autonomous vehicle so that the one or more virtual models can be seen by one or more external observers. In some examples, the autonomous vehicle can cause a virtual model to be displayed by one or more devices (e.g., a head mounted display (HMD), a heads-up display (HUD), an augmented reality (AR) device such as AR glasses, and/or other suitable device) worn by, attached to, or collocated with one or more external observers.

The virtual models can facilitate interactions between the one or more external observers and the autonomous vehicle. For instance, the one or more external observers can interact with the autonomous vehicle using one or more user inputs, such as using gestures or other visual cues, audio inputs, and/or other user inputs. In some examples, other types of communication techniques (e.g., utilizing audio and/or visual messages) can be used along with the one or more inputs to communicate with the autonomous vehicle. In one illustrative example, a gesture input and another type of communication technique (e.g., one or more audio and/or visual messages) can be used to communicate with the autonomous vehicle.

In some aspects, a virtual model can be encrypted with a unique encryption for a particular external observer. In some examples, the encryption can be based on a face image, iris, and/or other representative feature(s) of the external observer. In such examples, the external observer's face image, iris, and/or other representative feature(s) can be used to decrypt the virtual model that pertains to the external observer, while other virtual models, which may not pertain to the external observer (but may pertain to other external observers, for example), may not be decrypted by the external observer. Thus, by using the external observer-specific decryption, the external observer is enabled to view and interact with the virtual model created for that external observer, while the virtual models for other external observers are hidden from the external observer.

According to at least one example, a method of communication between one or more vehicles and one or more external observers is provided. The method includes detecting a first external observer for communicating with a vehicle. The method further includes obtaining, for the vehicle, a first virtual model for communicating with the first external observer. The method includes encrypting, based on one or more characteristics of the first external observer, the first virtual model to generate an encrypted first virtual model. The method further includes and communicating with the first external observer using the encrypted first virtual model.

In another example, an apparatus for communication between one or more vehicles and one or more external observers is provided that includes a memory configured to store data, and a processor coupled to the memory. The processor can be implemented in circuitry. The processor is configured to and can detect a first external observer for communicating with a vehicle. The apparatus is further configured to and can obtain, for the vehicle, a first virtual model for communicating with the first external observer. The apparatus is configured to and can encrypt, based on one or more characteristics of the first external observer, the first virtual model to generate an encrypted first virtual model. The apparatus is configured to and can communicate with the first external observer using the encrypted first virtual model.

In another example, a non-transitory computer-readable medium is provided that has stored thereon instructions that, when executed by one or more processors, cause the one or more processor to: detect a first external observer for communicating with a vehicle; obtain, for the vehicle, a first virtual model for communicating with the first external observer; encrypt, based on one or more characteristics of the first external observer, the first virtual model to generate an encrypted first virtual model; and communicate with the first external observer using the encrypted first virtual model.

In another example, an apparatus for communication between one or more vehicles and one or more external observers is provided. The apparatus includes means for detecting a first external observer for communicating with a vehicle. The apparatus further includes means for obtain, for the vehicle, a first virtual model for communicating with the first external observer. The apparatus includes means for encrypting, based on one or more characteristics of the first external observer, the first virtual model to generate an encrypted first virtual model, and means for communicating with the first external observer using the encrypted first virtual model.

In some aspects, the methods, apparatuses, and computer-readable medium described above further comprise detecting that at least the first external observer of the one or more external observers is attempting to communicate with the vehicle.

In some aspects, the methods, apparatuses, and computer-readable medium described above further comprise: detecting that at least the first external observer is attempting to communicate with the vehicle using one or more gestures.

In some aspects, the methods, apparatuses, and computer-readable medium described above further comprise: extracting one or more image features from one or more images comprising at least a portion of the first external observer; and detecting, based on the one or more image features, that the first external observer is attempting to communicate with the vehicle.

In some aspects, the methods, apparatuses, and computer-readable medium described above further comprise: identifying an input associated with the first external observer; and detecting, based on the input, that the first external observer is attempting to communicate with the vehicle. In some examples, the input includes one or more gestures.

In some aspects, detecting that at least the first external observer is attempting to communicate with the vehicle comprises: identifying one or more traits of the first external observer; detecting that the first external observer is performing the one or more gestures; and interpreting the one or more gestures based on the one or more traits of the first external observer.

In some aspects, the one or more traits comprise at least one of a language spoken by the first external observer, a race of the first external observer, or an ethnicity of the first external observer.

In some aspects, detecting that the first external observer is performing the one or more gestures and interpreting the one or more gestures based on the one or more traits comprises accessing a database of gestures.

In some aspects, the first virtual model is generated for the first external observer based on one or more traits of the first external observer.

In some aspects, the one or more traits comprise at least one of a language spoken by the first external observer, a race of the first external observer, or an ethnicity of the first external observer.

In some aspects, detecting the first external observer comprises: tracking a gaze of the first external observer; determining a field of view of the first external observer based on tracking the gaze; and detecting that the field of view includes at least a portion of the vehicle.

In some aspects, the one or more characteristics of the first external observer comprise at least one of a face characteristic or an iris of the first external observer.

In some aspects, communicating with the first external observer using the encrypted first virtual model comprises: decrypting frames of the encrypted first virtual model based on the one or more characteristics of the first external observer; and projecting the decrypted frames of first virtual model towards the first external observer.

In some aspects, projecting the decrypted frames of the first virtual model towards the first external observer comprises: detecting a field of view of the first external observer; and projecting a foveated rendering of the decrypted frames of the first virtual model to the first external observer based on the field of view.

In some aspects, the methods, apparatuses, and computer-readable medium described above further comprise enabling a first set of frames of the encrypted first virtual model to be visible to the first external observer; and preventing the first set of frames from being visible to one or more other external observers.

In some aspects, enabling the first set of frames to be visible comprises: displaying the first set of frames on a glass surface with a variable refractive index; and modifying the refractive index of the glass surface to selectively allow the first set of frames to pass through the glass surface in a field of view of the first external observer.

In some aspects, preventing the first set of frames from being visible comprises: displaying the first set of frames on a glass surface with a variable refractive index; and modifying the refractive index to selectively block the first set of frames from passing through the glass surface in a field of view of the one or more other external observers.

In some aspects, the methods, apparatuses, and computer-readable medium described above further comprise: detecting a second external observer for communicating with the vehicle; obtaining, for the vehicle, a second virtual model for communicating with the second external observer; encrypting, based on one or more characteristics of the second external observer, the second virtual model to generate an encrypted second virtual model; and communicating with the second external observer using the encrypted second virtual model simultaneously with communicating with the first external observer using the encrypted first virtual model.

In some aspects, the methods, apparatuses, and computer-readable medium described above further comprise: projecting a first set of frames of the encrypted first virtual model towards the first external observer; projecting a second set of frames of the encrypted second virtual model towards the second external observer; and preventing the first set of frames from overlapping the second set of frames.

In some aspects, preventing the first set of frames from overlapping the second set of frames comprises: displaying the first set of frames and the second set of frames on a glass surface with a variable refractive index; modifying a refractive index of a first portion of the glass surface to selectively allow the first set of frames to pass through the first portion of the glass surface in a field of view of the first external observer while blocking the second set of frames from passing through the first portion of the glass surface in the field of view of the first external observer; and modifying a refractive index of a second portion of the glass surface to selectively allow the second set of frames to pass through the second portion of the glass surface in a field of view of the second external observer while blocking the first set of frames from passing through the second portion of the glass surface in the field of view of the second external observer.

In some aspects, detecting the first external observer to communicate with the vehicle comprises detecting a device of the first external observer. In some aspects, the device includes a head mounted display (HMD). In some aspects, the device includes augmented reality glasses.

In some aspects, communicating with the first external observer using the encrypted first virtual model comprises establishing a connection with the device and transmitting, using the connection, frames of the encrypted first virtual model to the device. In some aspects, the device can decrypt the encrypted first virtual model based on the one or more characteristics.

In some aspects, the methods, apparatuses, and computer-readable medium described above further comprise generating the first virtual model. For example, in some examples, the apparatus is the vehicle or is a component (e.g., a computing device) of the vehicle. In such examples, the vehicle or component of the vehicle can generate the first virtual model. In some aspects, the methods, apparatuses, and computer-readable medium described above further comprise receiving the first virtual model from a server.

In some aspects, the methods, apparatuses, and computer-readable medium described above further comprise disabling or lowering a quality of the first virtual model upon termination of communication with at least the first external observer.

According to at least one other example, a method of communication between a vehicle and one or more external observers is provided. The method includes establishing, by a device, a connection between the device of an external observer of the one or more external observers and the vehicle. The method further includes, receiving, at the device, a virtual model of a virtual driver from the vehicle, and communicating with the vehicle using the virtual model.

In another example, an apparatus for communication between a vehicle and one or more external observers is provided that includes a memory configured to store data, and a processor coupled to the memory. The processor is configured to and can establish, by a device, a connection between the device of an external observer of the one or more external observers and the vehicle. The processor is configured to and can receive, at the device, a virtual model of a virtual driver from the vehicle, and communicate with the vehicle using the virtual model.

In another example, a non-transitory computer-readable medium is provided that has stored thereon instructions that, when executed by one or more processors, cause the one or more processor to: establish, by a device, a connection between the device of an external observer of the one or more external observers and the vehicle; receive, at the device, a virtual model of a virtual driver from the vehicle; and communicate with the vehicle using the virtual model.

In another example, an apparatus for communication between a vehicle and one or more external observers is provided. The apparatus includes means for establishing, by a device, a connection between the device of an external observer of the one or more external observers and the vehicle; means for receiving, at the device, a virtual model of a virtual driver from the vehicle; and means for communicating with the vehicle using the virtual model.

In some aspects, the device includes a head mounted display (HMD). In some aspects, the device includes augmented reality glasses.

In some aspects, the virtual model is encrypted based on one or more characteristics of the external observer.

In some aspects, establishing the connection is based on receiving a request to communicate with the vehicle. In some aspects, establishing the connection is based on sending a request to communicate with the vehicle. In some aspects, the virtual model is displayed by the device.

In some aspects, communicating with the vehicle using the received virtual model is based on one or more gestures.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
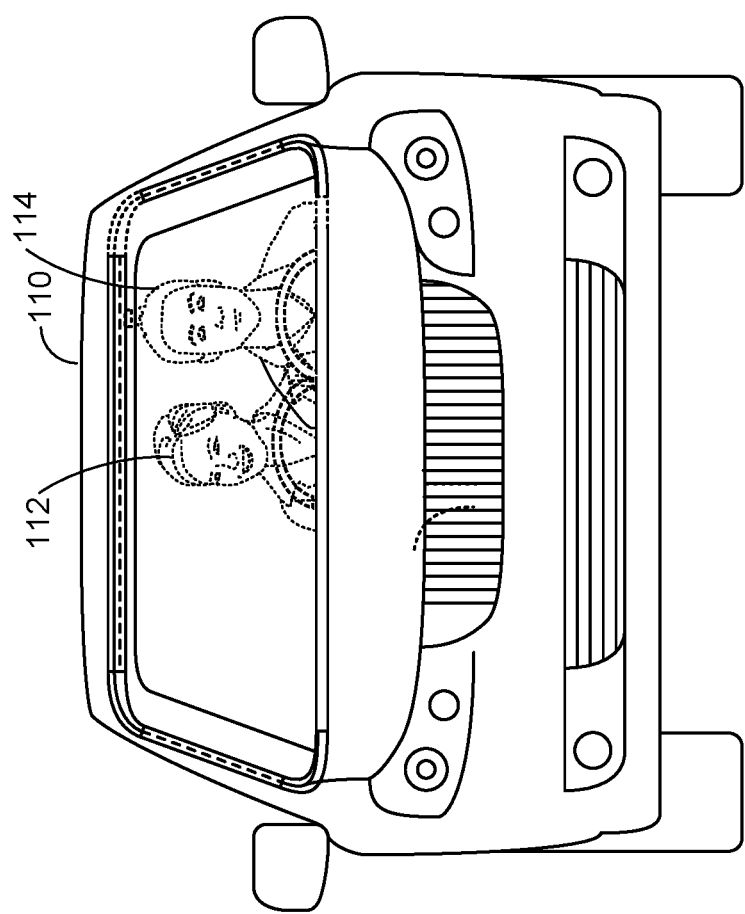
FIG. 1 illustrates an example system comprising an autonomous vehicle and one or more external observers, according to this disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Some of the challenges associated with operating a vehicle in traffic pertain to abiding by traffic laws, being aware of road conditions and surroundings, and communicating with drivers of other human-operated vehicles in the vicinity and with other external observers such as pedestrians. While human drivers may communicate by signaling their intentions through a number of intentional and subconscious acts (e.g., using hand gestures, eye gestures, tilting or turning their heads, using turn signals of the vehicle, brake lights, horns, etc.), the lack of a human driver in an autonomous vehicle limits the types of communications that are possible between the autonomous vehicle and the external observers. In current road and other traffic environments (e.g., parking lots), these communications between the vehicle and the external observers are very important for enabling safe and efficient flow of traffic.

With advances in autonomous vehicles, computers with artificial intelligence, a vast array of sensors, automation mechanisms, and other devices are able to replace a human driver in the autonomous vehicles. A fully autonomous vehicle may have no human driver in the driver seat, while one or more human passengers may be located in the other seats. While the autonomous vehicles may continue to have conventional signaling methods built in, such as turn signals and brake lights, they may lack the ability to carry out the various other types of communications that can be performed by human drivers.

Example aspects of this disclosure are directed to techniques for enabling or enhancing interactions between an autonomous vehicle and one or more external observers, such as pedestrians, through the use of virtual models of drivers. It should be understood that external observers, as used herein, may include pedestrians and/or passengers and/or drivers of other vehicles other than the autonomous vehicle.

In some examples, techniques and systems are described for generating virtual models that depict virtual drivers for autonomous vehicles. A virtual model generated using the techniques described herein allows interactions between an autonomous vehicle and one or more external observers. A virtual model can include an augmented reality and/or virtual reality three-dimensional (3D) model of a virtual driver (e.g., using mesh generation in graphics, a hologram, an anthropomorphic, humanoid, or human-like rendition of a driver) of the autonomous vehicle. In some cases, a virtual model can include a two-dimensional (2D) model of the virtual driver. In some examples, a virtual model can be generated by an autonomous vehicle. While some examples are described with respect to the autonomous vehicle performing the various functions, one of ordinary skill will appreciate that, in some implementations, the autonomous vehicle can be in communication with a server that can perform one or more of the functions described herein. For instance, in some examples, the server can send information to the autonomous vehicle, and the autonomous vehicle can display or otherwise present virtual models based on the information from the server. In some examples, a virtual model can be generated by a server or other remote device in communication with an autonomous vehicle, and the autonomous vehicle can receive the virtual model from the server or other remote device.

In some examples, one or more virtual models can be displayed within the autonomous vehicle (e.g., as a hologram or other depiction) or on a part (e.g., a windshield, a display, and/or other part of the vehicle) of the autonomous vehicle so that the one or more virtual models can be seen by one or more external observers. In some examples, the autonomous vehicle and/or the server can cause a virtual model to be displayed by one or more devices (e.g., a head mounted display (HMD), a heads up display (HUD), virtual reality (VR) glasses, an augmented reality (AR) device such as AR glasses, and/or other suitable device) worn by, attached to, or collocated with one or more external observers.

The virtual models can be used to facilitate interactions between the one or more external observers and the autonomous vehicle. For instance, the one or more external observers can interact with the autonomous vehicle using one or more user inputs, such as using gestures or other visual cues, audio inputs, and/or other user inputs. In some examples, one or more inputs (e.g., a gesture input) can be used in conjunction with other types of communication techniques (e.g., utilizing audio and/or visual messages) can be used to communicate with the autonomous vehicle.

In some cases, a virtual model of a virtual driver can be generated (e.g., as a 3D model) when an external observer is detected and/or when an external observer is identified as performing a particular action indicating that the external observer is trying to communicate with the autonomous vehicle. In some implementations, the virtual model can be a human-like digital projection or provide an image of a human-like figure. By providing a virtual model with which an external observer can interact, the external observer may realize an improved user experience as the external observer may feel at ease and comfortable interacting with a 3D model that appears like a human (e.g., a human-like digital projection or image of a human-like figure). For example, an external observer can interact with the virtual model of the virtual driver (e.g., to convey one or more messages to the virtual driver) using instinctive natural language communication techniques, such as hand gestures (e.g., waving, indicating a stop sign, indicating a yield or drive by sign, or other gesture), gestures with eyes (e.g., an eye gaze in the direction of the vehicle), audible or inaudible mouthing of words, etc.

As noted above, in some aspects, a virtual model can be generated by the autonomous vehicle upon detecting that an external observer is attempting to communicate with the autonomous vehicle. For example, an action triggering generation of a virtual model can include one or more gestures, an audible input, and/or other action performed by an external observer indicating that the external observer is attempting to communicate with the autonomous vehicle.

In some examples, the autonomous vehicle can utilize one or more markers to assist with detecting that the external observer is attempting to communicate with the autonomous vehicle. In some cases, a marker can include any visual cue which may attract an external observer's gaze to the autonomous vehicle or a portion thereof. For instance, the marker can include a portion of the windshield or an object in the driver's seat of the autonomous vehicle. In an illustrative example, a marker may include a physical model of a human in a driver seat of the autonomous vehicle to convey the existence of a driver being present. The physical model may attract the attention of an external observer and draw the external observer's gaze to the physical model. The physical model may be one or more images, cutouts (e.g., a cardboard cutout), three-dimensional (3D) shapes (e.g., a human-like mannequin, sculpture, figure, etc.), and/or other objects that may be placed in a driver seat or other portion of the autonomous vehicle to engage or attract an external observer's attention. In some cases, the marker may include the virtual model (e.g., a 2D or a 3D model) displayed in the autonomous vehicle (e.g., such as on the windshield of the vehicle or within the vehicle). As noted above, an external observer can interact with the virtual model using gestures or other input(s).

In some cases, after an interaction between an external observer and the virtual model is determined to be complete, the model (e.g., a projection or display of the model) may be withdrawn to reduce power consumption. In some cases, a fuzzier, low/lower quality (as compared to a higher quality rendering during established interactions with one or more external observers) and/or lower power projection of a 3D model of a virtual driver may always be presented (e.g., as a marker) within or on a part of the vehicle in order to convey to external observers that a virtual driver model is present with which communication (e.g., with gestures, audio input, etc.) is possible. A higher quality and/or higher power projection of the 3D model can be presented when interactions with one or more external observers are taking place.

In addition to the marker, the autonomous vehicle may also include one or more image sensors and object detection mechanisms to detect external observers. The one or more image sensors can include one or more video cameras, still image cameras, optical sensors, depth sensors, and/or other image capture devices. In one example implementation, feature extraction can be performed on captured images (e.g., captured by the one or more image sensors of the autonomous vehicle or other device). Object detection algorithms can then be applied on the extracted image features to detect an external observer. In some cases, a Weiner filter may be applied to sharpen the images. Object recognition can then be applied to the detected external observer to determine whether the detected external observer is directing gestures and/or other visual input toward the vehicle. In some cases, other input (e.g., audio input) can be used in addition to or as an alternative to gesture-based input. The gestures (or other input, such as audio) can be used as triggers that are used to trigger processes such as estimating the external observer's pose (pose estimation), rendering of the virtual driver, etc. In some cases, the external observer can be tracked using optical flow algorithms. The tracking quality (e.g., frames per second or "fps") may be increased when the external observer is detected as trying to communicate with the vehicle using gestures or other messaging techniques as outlined above.

In some implementations, the autonomous vehicle may include eye tracking mechanisms to detect an external observer's eyes or iris, such as to measure eye positions and/or eye movement of the external observer. The eye tracking mechanisms may obtain information such as the point of gaze (where the external observer is looking), the motion of an eye relative to the head of the external observer, etc. Using the eye tracking mechanisms, the autonomous vehicle can determine whether an external observer is looking at a marker associated with the autonomous vehicle (e.g., the virtual model of a virtual driver of the vehicle, a visual cue within or on the vehicle, and/or other marker). Various additional factors may be considered to determine with a desired level of confidence or certainty that an external observer is looking at the marker with an intent to communicate with the autonomous vehicle. For example, the duration of time that the external observer is detected to be looking at the marker and holding the gaze may be used to determine that the external observer is attempting to communicate with the autonomous vehicle.

As previously described, the autonomous vehicle can generate a virtual model upon detecting that an external observer is attempting to communicate with the autonomous vehicle. In some examples, the autonomous vehicle can detect that the external observer is attempting to communicate with the autonomous vehicle based on detecting that the external observer is viewing or gazing at the marker, as previously discussed. In some implementations, the virtual model generated by the autonomous vehicle upon detecting that the external observer is attempting to communicate with the autonomous vehicle may be different from the marker. In some aspects, the autonomous vehicle may generate a virtual model by determining a desire or need to communicate with an external observer, even if the external observer may not have first displayed an intent to communicate with the autonomous vehicle. For instance, the autonomous vehicle can determine a desire or need to get the attention of an external observer and can communicate with the external observer, even if the external observer did not look at the marker or otherwise establish an intent to communicate with the autonomous vehicle. In an illustrative example, the autonomous vehicle can determine at a pedestrian crossing that an external observer is attempting to cross in front of the autonomous vehicle in a manner which violates traffic rules or conditions, and the autonomous vehicle may wish to convey instructions or messages using at least one or more gestures, audio output, and/or other function performed by the virtual model.

In some examples, the virtual models can be customized for interacting with external observers. The customization of a virtual model of a driver can be based on one or more traits or characteristics of the external observer. A customized virtual model can have customized body language, customized gestures, customized appearance, among other customized features that are based on characteristics of the external observer. For example, an augmented reality 3D or 2D virtual model of a virtual driver can be customized to interact with a particular external observer based on the one or more traits or characteristics. The one or more traits or characteristics can include the ethnicity, appearance, actions, age, any combination thereof, and/or other trait or characteristic of the external observer.

In some cases, an object recognition algorithm including feature extraction can be used to extract features and to detect traits or characteristics of the external observer (e.g., the ethnicity of the external observer, the gender of the external observer, a hair color of the external observer, other characteristic of the external observer, or any combination thereof). In some examples, the object recognition used to determine whether the detected external observer is directing input toward the vehicle, as described above, or other object recognition algorithm can be used to perform the feature extraction to detect he traits or characteristics of the external observer.

The characteristics of the external observer can be used in customizing the virtual model of the driver generated for that external observer. For instance, the virtual model can be generated to match the ethnicity of the external observer, to speak in the same language as the external observer (e.g., as identified based on speech signals received from the external observer), and/or to match other detected characteristics of the external observer. Using ethnicity as one illustrative example, customization of the virtual model based on the detected ethnicity of the external observer can enhance the quality of communication based on ethnicity-specific gestures, ethnicity-specific audio (e.g., audio with an accent corresponding to the ethnicity), or other ethnicity-specific communication. In some implementations, the customized virtual models may be generated from previously learned models based on neural networks, such as in real time with cloud-based pattern matching. For example, the neural networks used to generate the virtual models may be continually retrained as more sample data is acquired.

In some examples, the autonomous vehicle can obtain gesture-related feature data, which may be used in the communications or interactions with the external observers. For instance, the autonomous vehicle can connect to and/or access a data store (e.g., a database or other storage mechanism) to obtain gesture-related feature data. In some examples, the data store may be a local database stored in the autonomous vehicle with known gestures. In some examples, the data store may be a server-based system, such as a cloud-based system comprising a database with the known gestures, from where the gesture-related information can be downloaded and stored on the autonomous vehicle, or accessed on demand as needed. When new gestures are detected and recognized, the data store (a local database and/or a database stored on the server) can be updated. In some examples, a neural network can recognize gestures based on being trained with the known gestures (e.g., using supervised learning techniques). In some cases, the neural network can be trained (e.g., using online training as the neural network is being used) with newly detected gestures and the new gestures can be saved in the data store.

In one illustrative example, the autonomous vehicle can compare a gesture performed by an external observer to one or more gestures from the data store to determine if the gesture is a recognized gesture that can be used as a trigger for generating the virtual model. A virtual model (e.g., a 2D or 3D rendering of a virtual driver) that can interact with the external observer may be generated based on an interpretation of detected gestures. For example, in some cases, a 3D rendering of the virtual driver may be generated as an augmented reality 3D projection (e.g., located in the driver's seat of the vehicle) to appear to the external observer as a driver of the autonomous vehicle. As noted above, the rendering of the virtual driver can be generated as a 2D model in some cases.

In some implementations, simultaneous multiple virtual models may be generated and used for interactions with multiple external observers. For example, two or more virtual models may be generated for interacting with two or more external observers simultaneously (e.g., a first virtual model generated for interacting with a first external observer, a second virtual model generated for interacting with a second external observer, and so on). The two or more virtual models may be rendered at specific angles and/or distances corresponding to the respective two or more external observers. For example, a first virtual model may be displayed at a first angle and/or a first distance relative to a first external observer, and a second virtual model may be displayed at a second angle and/or a second distance relative to a second external observer.

In various aspects of generating one or more virtual models for communicating with one or more external observers, the autonomous vehicle may utilize encryption techniques to ensure that a particular virtual model can be viewed only by a specific external observer who is an intended recipient, but not by other external observers who are not intended recipients of communications from one or more virtual models. In some examples, the encryption techniques may be employed in situations where multiple external observers are present, and simultaneous multiple virtual models are generated and used for interactions with the multiple external observers.

In some examples, an encryption technique can be based on extracting one or more image features of an external observer (e.g., using the object recognition algorithm described above or other object recognition algorithm). For example, one or more images of a face, an iris, and/or other representative features or portions of the external observer may be obtained from the one or more image sensors of the autonomous vehicle, and the one or more image features may be extracted from the one or more images (e.g., as one or more feature vectors representing the features, such as the face, iris, or other feature). The autonomous vehicle can encrypt a virtual model generated for communication with the external observer using the one or more image features. In some examples, an image feature can include one or more characteristics which are unique or distinguishable for an external observer, such as one or more features of the external observer's face, also referred to as a face identification (ID) of the external observer. The autonomous vehicle can use such image features, such as a face ID of the external observer, as a private key to encrypt frames of a virtual model generated for communicating with the external observer. In some examples, the autonomous vehicle may add the image features, such as the face ID, as metadata to frames of the virtual model which are generated for communicating with the external observer. This way, the autonomous vehicle can ensure that the frames of the virtual model are uniquely associated with the intended external observer with whom the virtual model will be used for communication.

The autonomous vehicle can decrypt the frames of the virtual model when they are displayed or projected in a field of view of the intended external observer. The autonomous vehicle may utilize the previously described eye tracking mechanisms to detect the external observer's gaze and field of view. In some examples, the autonomous vehicle can use foveated rendering techniques to project the decrypted frames of the virtual model towards the eyes of the external observer. Foveated rendering is a graphics rendering technique that utilizes eye tracking to focus or direct frames to the field of view of an external observer, while minimizing projection of images to a peripheral vision of the external observer. The peripheral vision is outside a zone gazed by fovea of the external observer's eyes. The fovea or fovea centralis is a small, central pit composed of closely packed cones in the eyes, located in the center of the retina and responsible for sharp central vision (also called foveal vision). The sharp central vision is used by humans for activities where visual detail is of primary importance. The fovea is surrounded by several outer regions, with the perifovea being the outermost region where visual acuity is significantly lower than that of the fovea. Use of foveated rendering achieves a focused projection of the frames in a manner which brings the frames into a sharp focus of the external observer's gaze, while minimizing or eliminating peripheral noise.

In some aspects, the decryption applied to the frames of the virtual model before the focused projection using foveated rendering ensures that the frames are viewed by the intended external observer. In one illustrative example, a decryption technique using a Rivest, Shamir, and Adelman (RSA) algorithm can be used to decrypt the frames using the image features of the external observer towards whom the frames are projected. In some examples, the autonomous vehicle can use the image features (e.g., the face ID or other image features) extracted from images of the external observer as a private key for this decryption. When multiple virtual models are generated and simultaneously projected to multiple external observers, the above-described encryption-decryption process ensures that frames of a virtual model, which were generated and encrypted using image features of an intended external observer, are decrypted using the image features of the intended external observer and projected to the intended external observer. The above-described encryption-decryption process also ensures that frames of the virtual model, which were generated and encrypted using image features of an intended external observer, are not decrypted using the image features of a different external observer, thus preventing an unintended external observer from being able to view the frames.

In some examples, as described above, the virtual model may be encrypted by the autonomous vehicle to generate an encrypted virtual model. In some examples, the virtual model may be encrypted by a server or other remote device in communication with an autonomous vehicle, and the autonomous vehicle can receive the encrypted virtual model from the server or other remote device. Likewise, in some examples, the virtual model may be decrypted by the autonomous vehicle to be projected to an intended external observer. In some examples, the virtual model may be decrypted by a server or other remote device in communication with an autonomous vehicle, and the autonomous vehicle can receive the decrypted virtual model from the server or other remote device to be projected to the intended external observer.

FIG. 1 is a schematic illustration of system 100 including an autonomous vehicle 110 shown in proximity to a first external observer 122 and a second external observer 124. As shown, the external observer 122 and the external observer 124 are humans walking, standing, or otherwise stationary in the vicinity of autonomous vehicle 110. In other illustrative examples, one or more external observers may be present in one or more vehicles in a driver or passenger capacity, mobile or stationary in a wheelchair or stroller, and/or in any other capacity that may be influential or relevant to the driving decisions that the autonomous vehicle 110 may make while navigating the environment where external observers such as the external observers 122, 124, etc., are present.

To enable communication between the autonomous vehicle 110 and the first and second external observer 122, 124 and, one or more virtual models 112, 114 may be generated by the autonomous vehicle 110 or by a server in communication with the autonomous vehicle 110. For instance, a first virtual model 112 may be generated for a first external observer 122, and a second virtual model 114 may be generated for a second external observer 124 when communication with multiple external observers is determined to be needed by the autonomous vehicle 110. One of ordinary skill will appreciate that more or fewer than two virtual models can be generated for more or fewer than the two external observers shown in FIG. 1.

Figure 2:
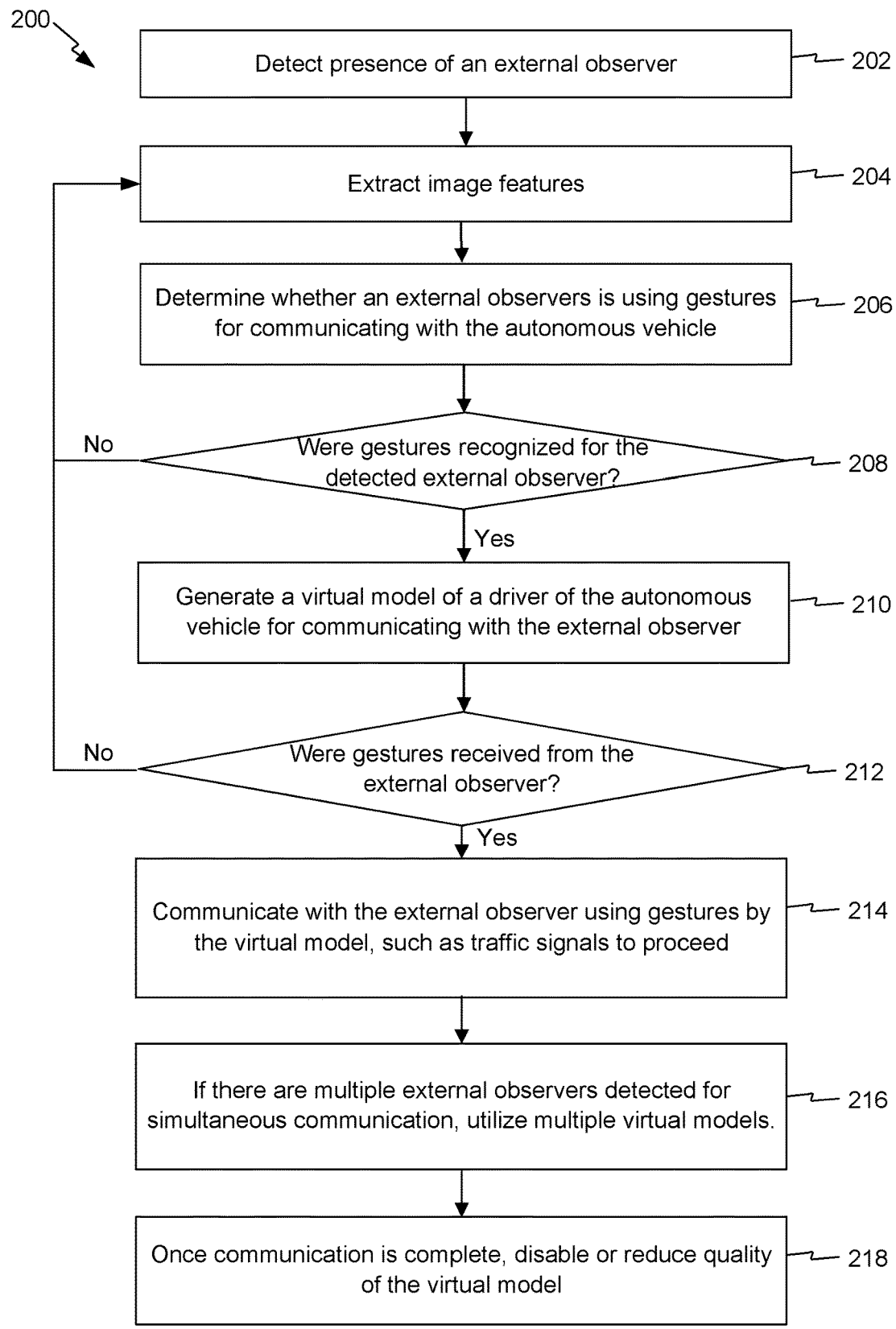
FIG. 2 illustrates an example of a process for creating virtual models of drivers for interacting with external observers, according to this disclosure.

FIG. 2 (described in conjunction with FIG. 1) illustrates a process 200 which may be performed by the autonomous vehicle 110 for creating one or more virtual models, according to one or more implementations described herein. For example, the process 200 may be used to generate the virtual models 112, 114 for enabling or enhancing interactions between the autonomous vehicle 110 and the first and second external observers 122, 124, respectively.

At block 202, the process 200 includes detecting the presence of one or more external observers. For example, the autonomous vehicle 110 can include image sensors (e.g., one or more video cameras, still image cameras, optical sensors, depth sensors, and/or other image capture devices) for capturing images in the vicinity of the autonomous vehicle 110. In some examples, the autonomous vehicle 110 may also use other types of sensors. For instance, the autonomous vehicle 110 can include radar, which uses radio waves to detect the presence, range, velocity, etc., of objects in the vicinity of the autonomous vehicle 110. Any other type of motion detection mechanism may also be employed in some examples to detect moving objects in the vicinity of the autonomous vehicle 110. The vicinity of the autonomous vehicle 110 may include areas surrounding the autonomous vehicle 110, including the front, back, and sides. In some examples, the autonomous vehicle 110 can utilize detection mechanisms that are particularly focused on a direction of travel of the autonomous vehicle 110 (e.g., towards the front and the back, depending if the autonomous vehicle 110 is moving forwards or in a reverse direction).

At block 204, the process 200 includes extracting image features of the external observer. For example, the autonomous vehicle 110 can implement image recognition or object recognition algorithms to identify humans (such as the first and second external observers 122 and 124) in the images captured by the autonomous vehicle in block 202. For instance, the autonomous vehicle 110 can obtain images from a video feed provided by the one or more image sensors in the block 202. In some cases, the autonomous vehicle 110 can split the video feed into static image frames. Object recognition algorithms can be applied to the images, where the images are segmented and image features are extracted.

In some examples, the autonomous vehicle 110 may analyze image data such as red-green-blue or "RGB" components of the images captured by the image sensors. The autonomous vehicle 110 may also use depth sensors to detect a depth (D) parameter pertaining to distance from of the detected objects, such as the external observers 122, 124, from the autonomous vehicle 110. The combination of RGB and D is referred to as RGBD data. The RGBD may include the RGB information and the depth information per image frame. The RGBD information may be used for object detection. The depth information (D) per image frame may be used to identify the distance of the pedestrians from the autonomous vehicle 110. In some cases, denoising of the extracted images can be performed (e.g., using Weiner filters) before image recognition is performed. Contour detection techniques may also be applied in some examples to detect contours of image objects.

Any type of object recognition can be performed. In some examples, the autonomous vehicle 110 can utilize saliency map modeling techniques, machine learning techniques (e.g., neural networks, or other artificial intelligence based object recognition), computer vision techniques, and/or other techniques for the image recognition. In some examples, deep learning techniques using convolution neural network for detection and recognition of objects as external observers may also be used. In one illustrative example, the autonomous vehicle 110 can perform object recognition using a saliency map model. For instance, feature maps may be obtained from the static images captured by the images to reveal the composition of features such as such as color (RGB), depth (D), orientation, intensity, motion characteristics, etc., in the static images. A summation of these feature maps provides saliency maps with saliency scores (or weights) of particular features of the static image frames. The saliency scores may be refined in an iterative manner and normalized. The normalized saliency scores may be compared with a database of saliency scores for images of human beings, for example, and/or other objects. Using the saliency scores, specific image features of humans may be extracted. For example, a face image, iris, and/or other representative features or portions of an external observer may be obtained.

At block 206, the process 200 includes determining whether one or more external observers are using one or more gestures for communicating with the autonomous vehicle. In one example implementation, object detection algorithms can be applied on the extracted image features to determine whether the extracted image features correspond to a human (e.g., the external observer 122 and/or 124). Object recognition or gesture recognition algorithms can then be applied to the detected external observer to determine whether the detected external observer is directing gestures and/or other visual input toward the vehicle. In some cases, other input (e.g., audio input) can be used in addition to or as an alternative to gesture-based input. For instance, voice recognition can be used to determine a voice command provided by an external observer (e.g., the external observer 122 and/or 124). The gestures (or other input, such as audio) can be used as triggers that are used to trigger processes such as estimating the external observer's pose (pose estimation), rendering of a virtual model of a virtual driver of the vehicle 110, etc. In some cases, as described below, the external observers 122, 124 can be tracked (e.g., using optical flow algorithms). In some examples, the tracking quality (e.g., frames per second or "fps") may be increased when one or more of the external observers 122, 124 are detected as trying to communicate with the vehicle using gestures or other messaging techniques as outlined above.

Body parts, such as the face, hand, etc., of the one or more external observers (e.g., the first and second external observers 122, 124) can be detected in one or more images using any suitable object detection technique. In one illustrative example, computer vision-based object detection can be used by a processor of the autonomous vehicle 110 to detect one or more body parts (e.g., one or both hands) of an external observer in an image. Object detection in general is a technology used to detect (or locate) objects from an image or video frame. When localization is performed, detected objects can be represented using bounding regions that identify the location and/or approximate boundaries of the object (e.g., a face) in the image or video frame. A bounding region of a detected object can include a bounding box, a bounding circle, a bounding ellipse, or any other suitably-shaped region representing a detected object.

Different types of computer vision-based object detection algorithms can be used by the processor of the autonomous vehicle 110. In one illustrative example, a template matching-based technique can be used to detect one or more hands in an image. Various types of template matching algorithms can be used. One example of a template matching algorithm can perform Haar or Haar-like feature extraction, integral image generation, Adaboost training, and cascaded classifiers. Such an object detection technique performs detection by applying a sliding window (e.g., having a rectangular, circular, triangular, or other shape) across an image. An integral image may be computed to be an image representation evaluating particular regional features, for example rectangular or circular features, from an image. For each current window, the Haar features of the current window can be computed from the integral image noted above, which can be computed before computing the Haar features.

The Harr features can be computed by calculating sums of image pixels within particular feature regions of the object image, such as those of the integral image. In faces, for example, a region with an eye is typically darker than a region with a nose bridge or cheeks. The Haar features can be selected by a learning algorithm (e.g., an Adaboost learning algorithm) that selects the best features and/or trains classifiers that use them, and can be used to classify a window as a hand (or other object) window or a non-hand window effectively with a cascaded classifier. A cascaded classifier includes multiple classifiers combined in a cascade, which allows background regions of the image to be quickly discarded while performing more computation on object-like regions. Using a hand as an example of a body part of an external observer, the cascaded classifier can classify a current window into a hand category or a non-hand category. If one classifier classifies a window as a non-hand category, the window is discarded. Otherwise, if one classifier classifies a window as a hand category, a next classifier in the cascaded arrangement will be used to test again. Until all the classifiers determine the current window is a hand (or other object), the window will be labeled as a candidate for being a hand (or other object). After all the windows are detected, a non-max suppression algorithm can be used to group the windows around each hand to generate the final result of one or more detected hands.

In some examples, machine learning techniques can be used to detect the one or more body parts (e.g., one or more hands) in an image. For example, a neural network (e.g., a convolutional neural network) can be trained, using labeled training data, to detect one or more hands in an image. In some examples, image features from the image frames captured by the one or more image sensors may be extracted based on contour detection to detect the body parts (e.g., the face, hand etc.) of the one or more external observers 122, 124, and the image features containing these body parts or other features may be provided to a neural network which has been trained to detect gestures. In some examples, the neural network may be trained to detect gestures pertaining to traffic related communications (e.g., pass, yield, stop, etc.).

Using the machine learning or computer-vision based techniques described above or using other techniques, the autonomous vehicle 110 can interpret gestures that the first external observer 122 and/or second external observer 124 may be using to communicate with the autonomous vehicle 110. For instance, as described herein, For instance, the autonomous vehicle 110 can obtain gesture-related feature data from a data store (e.g., a local database or a server-based system, such as a cloud-based system) to interpret a gesture from an external observer (e.g., external observer 122 and/or 124). In addition to parsing individual image frames for extracting image features, image sequences over multiple frames can be used in some examples to interpret actions in a series of image frames. For example, an action series in an image sequence may indicate a hand motion such as a hand waving, indicating a stop sign, etc.

At block 208, the process 200 includes determining whether any gestures were recognized for one or more detected external observers. In some aspects, the autonomous vehicle 110 may determine whether one or more of the external observers 122, 124 are attempting to communicate with the autonomous vehicle. In some cases, markers, as previously described, may be used by the autonomous vehicle 110 in conjunction with eye tracking mechanisms to determine whether the external observers 122, 124 are looking at the driver seat of the autonomous vehicle. In an illustrative example, a marker may include a physical model of a human in a driver seat of the autonomous vehicle to convey the existence of a driver being present. The physical model may attract the attention of an external observer and draw the external observer's gaze to the physical model. The physical model may be one or more images, cutouts (e.g., a cardboard cutout), 3D shapes (e.g., a human-like mannequin, sculpture, figure, etc.), or other objects that may be placed in a driver seat (or other portion of the autonomous vehicle 110 where the virtual models 112, 114 are shown) to engage or attract an external observer's attention.

In some cases, the marker may include a 2D or 3D model displayed in the autonomous vehicle 110 (e.g., such as on the windshield of the autonomous vehicle 110 or within the autonomous vehicle 110) which the external observers 122, 124 may interact with using gestures or other input. In some examples, in addition to the one or more gestures described above, the autonomous vehicle 110 may also determine whether one or more of the external observers 122, 124 are using an audible input, and/or other actions indicating that one or more of the external observers 122, 124 are attempting to communicate with the autonomous vehicle 110. If the one or more external observers 122, 124 are determined to be using one or more gestures (or other input) to communicate with the autonomous vehicle 110, the process 200 can proceed to the block 210. Otherwise, the blocks 204-206 may be repeated to continue to extract image features and detect whether one or more external observers are using gestures for communicating with the autonomous vehicle 110.

At block 210, the process 200 includes generating one or more virtual models of one or more virtual drivers of the autonomous vehicle for communicating with the one or more detected external observers. For example, the virtual models 112, 114 may be generated for communicating with the one or more detected external observers 122, 124. In some examples, the one or more virtual models 112, 114 may initiate communication with the one or more detected external observers using gestures or other interactive output (e.g., an audible message). In some implementations, the customized virtual models may be generated from previously learned models based on neural networks, such as in real time with cloud-based pattern matching. For example, the neural networks used to generate the virtual models may be continually retrained as more sample data is acquired.

In some examples, the virtual models 112, 114 may be customized for interacting with the external observers 122, 124. The customization of the virtual models 112, 114 can be based on one or more traits or characteristics of the external observers 122, 124 in some cases. A customized virtual model can have customized body language, customized gestures, customized appearance, among other customized features that are based on characteristics of the external observer. For example, the virtual models 112, 114 can be customized to interact with external observers 122, 124 based on their respective characteristics (e.g., the ethnicity, appearance, actions, age, etc.). In some cases, the object recognition algorithm for feature extraction in block 204, for example, may further extract features to detect characteristics such as the ethnicity of the external observer, which may be used in customizing the virtual models 112, 114 generated for the respective external observers 122, 124. For instance, the virtual models 112, 114 may be created to match the respective ethnicities of the external observers 122, 124. This may enhance the quality of communication based on ethnicity-specific gestures, for example.

In some examples, the autonomous vehicle 110 can obtain gesture-related feature data which may be used in the communications or interactions with the external observers. For instance, the autonomous vehicle 110 can connect to and/or access a data store (e.g., a local database or a server-based system, such as a cloud-based system) to obtain gesture-related feature data. In one illustrative example, the autonomous vehicle 110 can compare a gesture performed by one or more of the external observers 122, 124 to one or more gestures from the data store to determine if the gesture is a recognized gesture that can be used as a trigger for generating the respective virtual models 112, 114. The virtual models 112, 114 can be generated to interact with the external observers 122, 124 based on an interpretation of detected gestures.

At block 212, the process 200 includes determining whether one or more gestures were received from the one or more external observers. For example, the autonomous vehicle 110 may determine whether the one or more external observers 122, 124 are utilizing gestures. As previously described, object recognition algorithms can then be applied to the extracted image features of the detected external observers 122, 124 to determine whether one or more of the detected external observer 122, 124 are directing gestures and/or other visual input toward the autonomous vehicle 110. The gestures (or other input, such as audio) can be used as triggers that are used to trigger processes such as estimating the external observer's pose (pose estimation). At block 212, if one or more gestures are not received, then the blocks 208-210 may be repeated. Otherwise, the process 200 can proceed to the block 214.

At block 214, the process 200 includes communicating with the one or more external observers using the one or more virtual models. For example, the processor of the autonomous vehicle 110 can cause the one or more virtual models 112, 114 to communicate with the one or more external observers 122, 124 using hand gestures to direct the one or more external observers to proceed, stop, etc. In some examples, the gestures used by the one or more virtual models 112, 114 may be customized for interacting with external observers 122, 124. The customization of the gestures can be based on one or more traits or characteristics of the respective external observers 122, 124. For example, the customized gestures can include customized body language that may be based on the characteristics or traits (e.g., the ethnicity, appearance, actions, age, etc.) of the external observers 122, 124. This may enhance the quality of communication based on ethnicity-specific gestures, for example.

At block 216, process 200 may include generating multiple virtual models for multiple external observers detected. As previously described, two or more virtual models 112, 114 can be generated by the autonomous vehicle 110 for interacting with two or more external observers 122, 124. In some cases, the autonomous vehicle 110 can use the two or more virtual models 112, 124 for simultaneously communicating with the two or more external observers 122, 124. Aspects of simultaneous communication using two or more virtual models will be discussed in further detail in the following sections.

In some examples, in addition to the interactions enabled by the virtual models 112, 114, the autonomous vehicle 110 may also use audio or other means for communication (e.g., turn signals, brake lights, etc.).

At block 218, process 200 includes disabling or reducing quality of the one or more virtual models upon termination of respective communications using the one or more virtual models. For example, the autonomous vehicle 110 can reduce the power consumption involved in generating and maintaining the virtual models 112, 114 by disabling the virtual models 112, 114 after they have served their purpose for communicating with the external observers 122, 124 and no longer need to be maintained (or maintained at the quality level which was used during communication). For example, a reduced quality virtual model (e.g., a fuzzy or low quality rendering of a virtual driver) and/or a marker may be retained when communication with the external observers 122, 124 is terminated. In some cases, the reduced quality virtual models and/or markers may always be maintained, or may be enabled at traffic lights or other areas where high foot traffic is expected, for example, to indicate to potential external observers that a virtual model of a driver is present with which the external observer can interact. Maintaining a reduced quality virtual model and/or marker for display to potential external observers may encourage the potential external observers to initiate communications using gestures or other inputs. The quality of the one or more virtual models may be enhanced when interactions with the corresponding external observers commence.

As previously described, some methods of communication between an autonomous vehicle and external observers according to this disclosure may include the use of encryption techniques. In some examples, the encryption techniques can be employed in situations where multiple external observers are present, and where simultaneous multiple virtual models are generated and used for interactions with the multiple external observers. For example, upon detecting the two external observers 122, 124 for communicating with the autonomous vehicle 110 and generating or obtaining (e.g., from a server) virtual models 112, 114, the autonomous vehicle 110 can apply an encryption technique to the virtual models 112, 114 to ensure that a particular virtual model can be viewed only by a specific external observer who is an intended recipient, but not by other external observers. For example, the frames of the virtual model 112 can be encrypted so that the virtual model 112 can be viewed only by the external observer 122 and cannot be viewed by the external observer 124. Similarly, encryption techniques may be used to ensure that the virtual model 114 can be viewed only by the external observer 124 who is an intended recipient, but not by other external observers such as the external observer 122.

In some examples, an encryption technique may be based on extracting one or more image features of an external observer. For example, a face image, iris, and/or other representative features or portions of the external observer 122 may be obtained from the one or more image sensors of the autonomous vehicle. In some examples, the representative features or portions of the external observer 122 may include the face ID of the external observer 122 that includes unique facial feature characteristics of the external observer 122. The autonomous vehicle 110 can encrypt the virtual model 112 generated for communication with the external observer 122 using the one or more image features such as the face ID of the external observer 122. For example, the autonomous vehicle 110 may use the face ID as a private key to encrypt one or more frames of the virtual model 112. In some examples, the autonomous vehicle 110 may additionally or alternatively add the face ID to frames of the virtual model 112 (e.g., as metadata to one or more packets of the frames). The encrypted virtual model can be used for communicating with the external observer 122. This way, the autonomous vehicle 110 can ensure that the frames of the virtual model 112 are uniquely associated with the intended external observer 122 with whom the virtual model 112 will be used for communication.

In some examples, the autonomous vehicle 110 can decrypt the frames of the virtual model 112 when the frames are displayed or projected in a field of view of the intended external observer 122. As described above, the autonomous vehicle can use foveated rendering techniques to project the decrypted frames of the virtual model 112 towards the eyes of the external observer 122. The autonomous vehicle 110 may utilize the previously described eye tracking mechanisms to detect the gaze and field of view of the external observer 122. In some aspects, the decryption applied to the frames of the virtual model 112 before the focused projection using foveated rendering ensures that the frames are viewed by the intended external observer 122. The autonomous vehicle 110 can use the image features extracted from the external observer 122 for decrypting the frames.

When multiple virtual models 112, 114 are generated and simultaneously projected to multiple external observers 122, 124, the above-described encryption-decryption process ensures that frames of the virtual model 112, which were generated and encrypted using image features of an intended external observer 122, are decrypted using the image features of the intended external observer 122 and projected to the intended external observer 122. The above-described encryption-decryption process also ensures that frames of the virtual model 112, which were generated and encrypted using image features of an intended external observer 122, are not decrypted using the image features of a different external observer such as the external observer 124, thus preventing the unintended external observer 124 from being able to view the frames of the virtual model 112.

In some examples, the virtual models 112, 114 may be encrypted by the autonomous vehicle 110 in the above-described manner to generate respective encrypted virtual models. In some examples, the virtual models 112, 114 may be encrypted by a server or other remote device (not shown) in communication with the autonomous vehicle 110, and the autonomous vehicle 110 can receive the encrypted virtual models from the server or other remote device. Likewise, in some examples, the encrypted virtual models may be decrypted by the autonomous vehicle 110, to be projected to respective intended external observers 122, 124. In some examples, the encrypted virtual models may be decrypted by a server or other remote device in communication with the autonomous vehicle 110, and the autonomous vehicle 110 can receive the decrypted virtual models from the server or other remote device to be projected to the intended external observers 122, 124.

Figure 3:
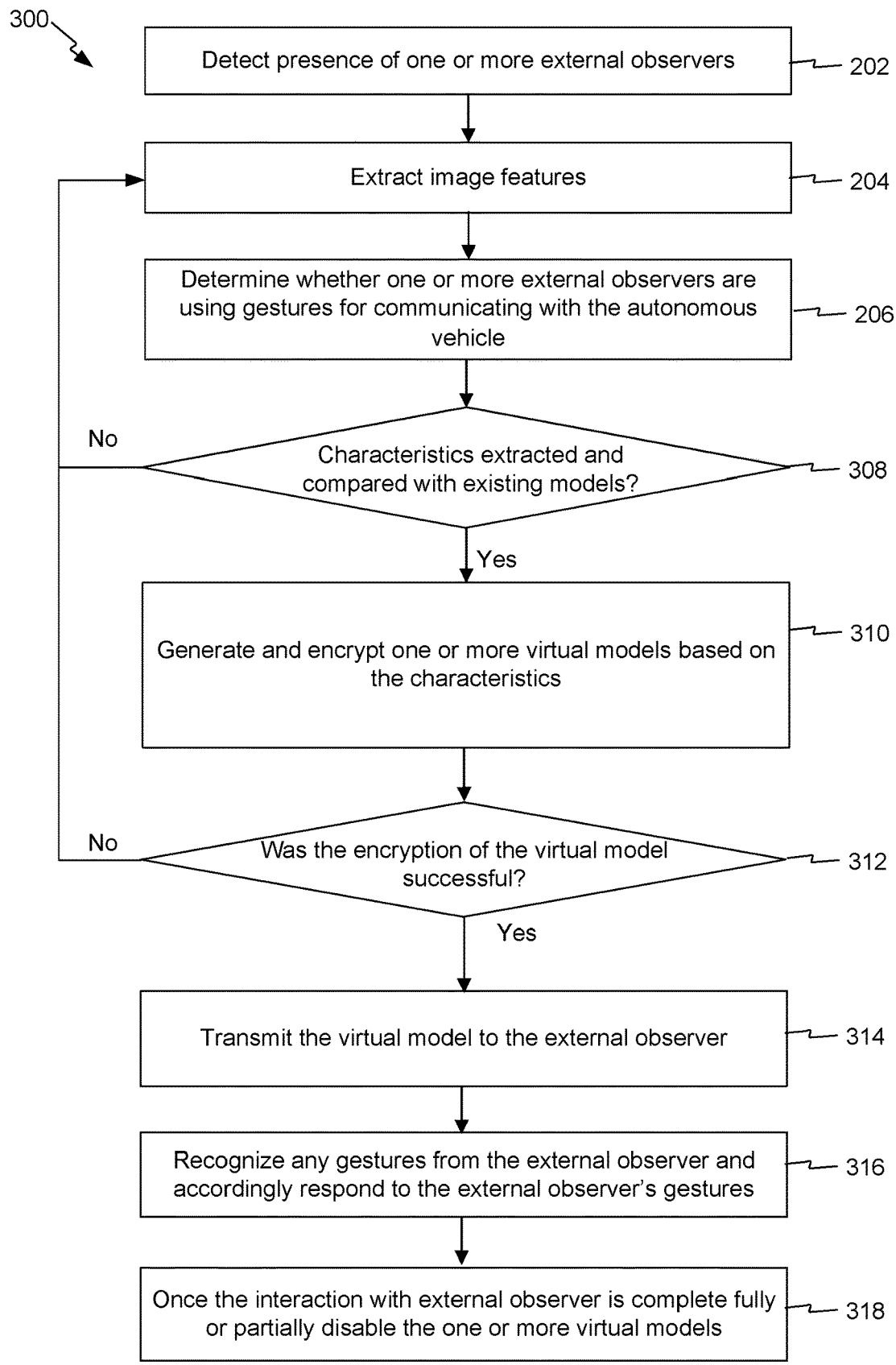
FIG. 3 illustrates an example of a process for creating and encrypting virtual models of drivers for interacting with external observers, according to this disclosure.

FIG. 3 illustrates another process 300 for communication between an autonomous vehicle and one or more external observers. As described below, the process 300 can be performed to generate one or more virtual models (e.g., virtual models 112, 114) based on respective one or more traits of one or more external observers (e.g., external observers 122, 124). The process 300 can encrypt the one or more virtual models (e.g., virtual models 112, 114) based on one or more characteristics (e.g., a face characteristic or iris) of the respective one or more external observers (e.g., external observers 122, 124).

As shown, the process 300 includes the blocks 202-206 as described above with reference to FIG. 2. For example, at block 202, the process 300 includes detecting an external observer. At block 204, the process 300 includes extracting image features of one or more detected external observers. At block 206, the process 300 includes tracking the one or more detected external observers and determining whether the one or more external observers are using one or more gestures for communicating with the autonomous vehicle. Further details of these blocks 202-206 will not be repeated here for the sake of brevity.

At block 308, process 300 includes extracting one or more characteristics of the external observer and comparing the one or more characteristics with existing models. For example, a face image, iris, and/or other representative features or portions of the external observer may be extracted from the images captured by the one or more image sensors of the autonomous vehicle 110. A face identification (ID) may be associated with the one or more face characteristics or iris characteristics of the external observers, where a face ID may be unique to an external observer and/or distinguish one external observer from one or more other external observers. For example, the face IDs of the external observers 122, 124 may be distinguishable from one another and from face IDs of one or more other external observers who may be detected in the presence of the autonomous vehicle 110. In some aspects, the one or more characteristics, face IDs, etc., may be compared with characteristics stored in a data store (e.g., database or other storage mechanism) of virtual models. In some cases, one or more neural networks and/or other artificial intelligence systems implemented by one or more processors or computers may be trained for learning and associating characteristics of external observers with different virtual models. The one or more processors or computers may be part of the autonomous vehicle, or may be part of one or more remote systems (e.g., a server-based or cloud-based system). Once the processes in the block 308 are completed to extract the characteristics of the one or more external observers, the process 300 may proceed to the block 310. Until the characteristics of the one or more external observers are extracted and compared with the existing models, the blocks 204-206 may be repeated.

At block 310, process 300 includes generating one or more virtual model of one or more virtual drivers and encrypting the one or more virtual models based on the above-described characteristics of the one or more external observers. Referring to FIG. 1, the virtual models 112, 114 can be encrypted by the autonomous vehicle 110 to generate respective encrypted virtual models. In some examples, the virtual models 112, 114 may be encrypted by a server or other remote device in communication with an autonomous vehicle 110, and the autonomous vehicle 110 can receive the encrypted virtual model from the server or other remote device.

As described above, the face characteristics and/or other image features of the external observer 122, 124 may be used to encrypt the respective virtual models 112, 114 for the external observers 122, 124. For example, the autonomous vehicle 110 may use the one or more image features (e.g., face IDs) of the respective external observers 122, 124 as private keys for encrypting frames of the respective virtual models 112, 114 which are generated for communicating with the external observers 122, 124. In some examples, the autonomous vehicle may add the image features (e.g., face IDs) of the respective external observers 122, 124 as metadata to frames of the respective virtual models 112, 114 which are generated for communicating. By encrypting the virtual models 112, 114 (e.g., using face IDs included as metadata in one or more frames), the autonomous vehicle 110 may ensure that the frames of the virtual models 112, 114 are uniquely associated with the intended external observers 122, 124, respectively, with whom the virtual models 112, 114 will be used for communications.

At block 312, the process 300 returns to block 204 if the virtual model was not encrypted. Otherwise, the process 300 proceeds to block 314. At block 314, the process 300 includes transmitting the encrypted virtual models to or toward the external observers. In some examples, the autonomous vehicle 110 may decrypt the frames of the virtual models when they are displayed or projected in a field of view of the intended external observer. As described above, in some cases the autonomous vehicle 110 can use foveated rendering techniques to project the decrypted frames of the encrypted virtual models towards the eyes of the external observers 122, 124. The autonomous vehicle may utilize the previously described eye tracking mechanisms to detect the external observer's gaze and field of view for the foveated rendering.

In some aspects, the decryption applied to the frames of the encrypted virtual models before the focused projection using foveated rendering ensures that the frames are viewed by the intended external observers 122, 124. For example, an RSA algorithm may be used to decrypt the frames using the image features of the intended external observers (obtained in the block 308). In some aspects, the decryption applied to the frames of the virtual model 112 before the focused projection using foveated rendering ensures that the frames are viewed by the intended external observer 122. The autonomous vehicle 110 may use the image features extracted from the external observer 122 for the decryption.

When multiple virtual models 112, 114 are generated and simultaneously projected to multiple external observers 122, 124, the above-described encryption-decryption process ensures that frames of the virtual model 112 are decrypted using the image features of the intended external observer 122 and projected to the intended external observer 122, and also ensures that frames of the virtual model 112 are not decrypted using the image features of a different external observer such as the external observer 124, thus preventing the unintended external observer 124 from being able to view the frames of the virtual model 112.

At block 316, process 300 includes recognizing one or more gestures from the external observer. For example, the one or more external observers 122, 124 may communicate with gestures upon receiving and/or observing the respective frames of the virtual models 112, 114 that were respectively transmitted to or toward the external observers 122, 124. In some examples, the gestures recognized at block 316 may be responsive to instructions conveyed by the virtual models 112, 114 (e.g., in the form of gestures). The autonomous vehicle 110 can recognize the gestures performed by the one or more external observers 122, 124 and can respond appropriately. For example, the autonomous vehicle 110 can modify one or more of the virtual models 112, 114 to provide a response to any received gestures (or other input) from the respective one or more external observers 122, 124, and/or take other action, such as stopping the autonomous vehicle, in response to the gestures (or other input) from the one or more external observers 122, 124.

At block 318, process 300 includes fully or partially disabling the one or more virtual models once the interaction with the respective external observers using the one or more virtual models is complete. In an illustrative example, the interaction with the external observer 122 may be deemed complete once the external observer 122 has taken an action (e.g., has yielded or crossed the road) as directed by the respective virtual model 112. In some examples, the interaction with the external observer may be deemed complete once the external observer has left a field of view (e.g., specifically pertaining to a direction of travel) of the autonomous vehicle. In some examples, the interaction with the external observer may be deemed complete if the external observer is no longer displaying an intent to communicate with the autonomous vehicle (e.g., no longer using gestures or no longer viewing the marker of the autonomous vehicle).

As described above, the autonomous vehicle 110 can reduce the power consumption involved in generating and maintaining the virtual models 112, 114 by disabling the virtual models 112, 114 after they have served their purpose for communicating with the external observers 122, 124 and no longer need to be maintained (or maintained at the quality level which was used during communication). In some examples, a reduced quality virtual model (e.g., a fuzzy or low quality rendering of a virtual driver) or a marker may be retained when communication with the external observers 122, 124 is terminated. As previously described, the reduced quality virtual models and/or markers may always be maintained, or may be enabled at traffic lights or other areas where high foot traffic is expected, for example, to indicate to potential external observers that a virtual model of a driver is present.

Figure 4:
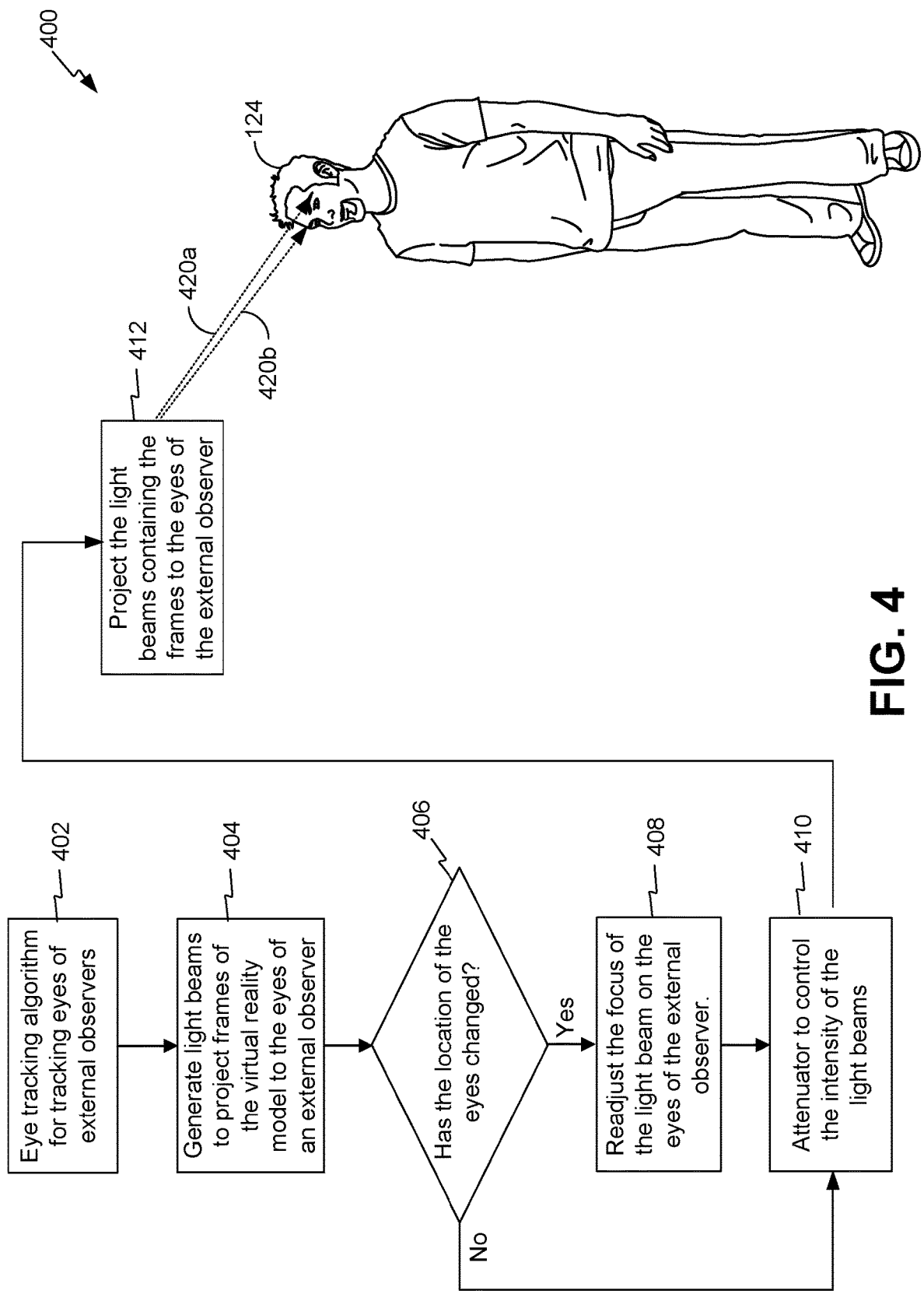
FIG. 4 illustrates an example of a process for projecting beams of virtual models of drivers for interacting with external observers, according to this disclosure.

FIG. 4 illustrates a process 400 illustrating an example of projecting frames of a virtual model to an external observer's eyes. In some examples, the frames of the virtual model may include encrypted frames and the projection may include foveated rendering of the decrypted frames as discussed with reference to FIG. 3.

At block 402, the process 400 includes tracking eyes of an external observer. For example, an iris and/or a retina of the external observer 124 may be tracked by the autonomous vehicle 110 using tracking algorithms. The objects can be tracked at specific locations in consecutive frames to detect motion of the objects amongst the frames. Motion vectors may be generated for the objects based on their tracked motion, and the motion vectors may be associated with the motion of the objects. The motion vectors may be recorded and analyzed to reveal information on actions performed by the tracked objects. For example, the tracking algorithms may reveal motion information on tracked objects such as the eyes, head, hands, etc., of the external observer 124. The tracking algorithms may be used for detecting eye gaze and field of view by tracking the eyes (e.g., the retina and/or iris) of the external observer 124, for example.

In some examples, the tracking algorithms can include an optical flow tracking to track objects (e.g., the eyes or portion of the eyes of an external observer, such as one or more irises and/or retinas) in the image frames captured by the image sensors of the autonomous vehicle 110. Any suitable type of optical flow technique or algorithm can be used to determine optical flow between frames. The optical flow motion estimation can be performed on a pixel-by-pixel basis in some cases. For instance, for each pixel in a current frame y, the motion estimation f defines the location of the corresponding pixel in the previous frame x. The motion estimation f for each pixel can include an optical flow vector that indicates a movement of the pixel between the frames. In some cases, the optical flow vector for a pixel can be a displacement vector (e.g., indicating horizontal and vertical displacements, such as x- and y-displacements) showing the movement of a pixel from a first frame to a second frame.

In some examples, optical flow maps (also referred to as motion vector maps) can be generated based on the computation of the optical flow vectors between frames. Each optical flow map can include a 2D vector field, with each vector being a displacement vector showing the movement of points from a first frame to a second frame (e.g., indicating horizontal and vertical displacements, such as x- and y-displacements). The optical flow maps can include an optical flow vector for each pixel in a frame, where each vector indicates a movement of a pixel between the frames. For instance, a dense optical flow can be computed between adjacent frames to generate optical flow vectors for each pixel in a frame, which can be included in a dense optical flow map. In some cases, the optical flow map can include vectors for less than all pixels in a frame, such as for pixels only belonging to one or more parts of an external observer being tracked (e.g., eyes of an external observer, one or more hands of an external observer, and/or other parts). In some examples, Lucas-Kanade optical flow can be computed between adjacent frames to generate optical flow vectors for some or all pixels in a frame, which can be included in an optical flow map.

As noted above, optical flow vectors or an optical flow map can be computed between adjacent frames of a sequence of frames (e.g., between sets of adjacent frames $x_t$ and $x_{t-1}$). Two adjacent frames can include two directly adjacent frames that are consecutively captured frames or two frames that are a certain distance apart (e.g., within two frames of one another, within three frames of one another, or other suitable distance) in a sequence of frames. Optical flow from frame $x_{t-1}$ to frame $x_t$ can be given by $Ox_{t-1}$, $x_t$=dof $(x_{t-1}, x_t)$, where dof is the dense optical flow. Any suitable optical flow process can be used to generate the optical flow maps. In one illustrative example, a pixel l(x, y, t) in the frame $x_{t-1}$ can move by a distance ($\Delta x$, $\Delta y$) in the next frame $x_t$. Assuming the pixels are the same and the intensity does not change between the frame $x_{t-1}$ and the next frame $x_t$, the following equation can be assumed:

$$l(x,y,t)=1(x+\Delta x, y+\Delta y, t+\Delta t) \quad \text{Equation (1)}.$$

By taking the Taylor series approximation of the right-hand side of Equation (1) above, and then removing common terms and dividing by $\Delta t$, an optical flow equation can be derived:

$$f_x u + f_y v + f_t = 0, \quad \text{Equation (2)},$$

where:

$$f_x = \frac{df}{dx};$$

$$f_y = \frac{df}{dy};$$

$$f_t = \frac{df}{dt};$$

$$u = \frac{\Delta x}{\Delta t}; \text{ and}$$

$$v = \frac{\Delta y}{\Delta t}.$$

Using the optical flow Equation (2), the image gradients $f_x$ and $f_y$ can be found along with the gradient along time (denoted as $f_t$). The terms u and v are the x and y components of the velocity or optical flow of l(x, y, t), and are unknown. An estimation technique may be needed in some cases when the optical flow equation cannot be solved with two unknown variables. Any suitable estimation technique can be used to estimate the optical flow. Examples of such estimation techniques include differential methods (e.g., Lucas-Kanade estimation, Horn-Schunck estimation, Buxton-Buxton estimation, or other suitable differential method), phase correlation, block-based methods, or other suitable estimation technique. For instance, Lucas-Kanade assumes that the optical flow (displacement of the image pixel) is small and approximately constant in a local neighborhood of the pixel I, and solves the basic optical flow equations for all the pixels in that neighborhood using the least squares method.

At block 404, the process 400 includes generating light beams containing frames of the virtual model generated for communicating with an external observer, as discussed above. In some examples, these light beams may be focused towards the external observer's eyes based on the field of view of the external observer. In some examples, focusing the light beams towards the external observer's eyes is referred to as a projection mode of the autonomous vehicle 110. For example, the retina tracking in the block 402 may reveal the field of view of the external observer 124. The autonomous vehicle 110 may include a projector for projecting frames of the virtual model 114, for example, to the retina of the external observer. The projected frames may include RGB or High-Definition Multimedia Interface (HDMI) encrypted frames in some examples.

At block 406, the process 400 includes determining whether the location of the external observer's eyes have changed. For example, the eyes of the external observer 124 may change due to relative movement between the external observer 124 and the autonomous vehicle 110. If a location change is determined, the focus of the light beams are correspondingly changed at block 408 so that the projected frames are projected in the field of view of the external observer. If a location change is not determined, the process 400 proceeds directly to block 410.

At block 410, the process 400 may use an attenuator, for example, to control the intensity of the light beams to be projected to the eyes of the external observer 124. Controlling the intensity of the light beams can ensure that the light beams are not too bright or too dim. The optimal brightness may be determined based on the ambient light, light generated from the autonomous vehicle's head lights, etc. At block 412, the appropriately adjusted light beams containing the frames of the virtual model of the driver are projected to the eyes of the external observer. The external observer 124 is shown in an illustrative example of FIG. 4, with light beams 420a-b being projected to the eyes of external observer 124. The light beams 420a-b may be generated according to blocks 402-412 and can contain frames of the virtual model 114 in some examples.

In some examples, multiple virtual models can be generated and directed to multiple external observers using the focused projection techniques discussed in FIG. 4. As previously explained, two or more virtual models may be simultaneously viewed by two or more external observers. In some cases, there is an overlap in the field of view of different external observers. The following description is directed to example implementations for handling such overlap.

It is recognized that simultaneous communication with two or more external observers using two or more virtual models using the above-described techniques may involve situations in which the two or more external observers may simultaneously view the two or more virtual models. In some cases, the above-described encryption-decryption techniques in conjunction with the projection of foveated rendering may address confusion and lack of clarity which may ensue when two or more virtual models are simultaneously viewed by two or more external observers.

In some aspects, the simultaneous projection of two or more virtual models to two or more external observers may overlap even when foveated rendering and focused projection beams are utilized. This may be the case when, for example, two external observers are positioned in close proximity to one another and/or when their fields of view are overlapping to some degree. For example, the external observer 122 may be positioned close to a side of the external observer 124. In another example, the external observer 124 may be positioned behind the external observer 122, with the autonomous vehicle 110 being positioned in front of the fields of views of both the external observers 122, 124. In these types of scenarios, there may be an overlap in the fields of views of the external observers 122, 124 which include the autonomous vehicle. For example, a first field of view of the external observer 122 can include the projection of the virtual model 112 may overlap a second field of view of the external observer 124 that includes the projection of the virtual model 114. The following example aspects are directed to techniques for addressing the simultaneous projections of two or more virtual models, including scenarios in which there may be overlap in the fields of views of the external observers viewing the two or more virtual models.

Figure 5:
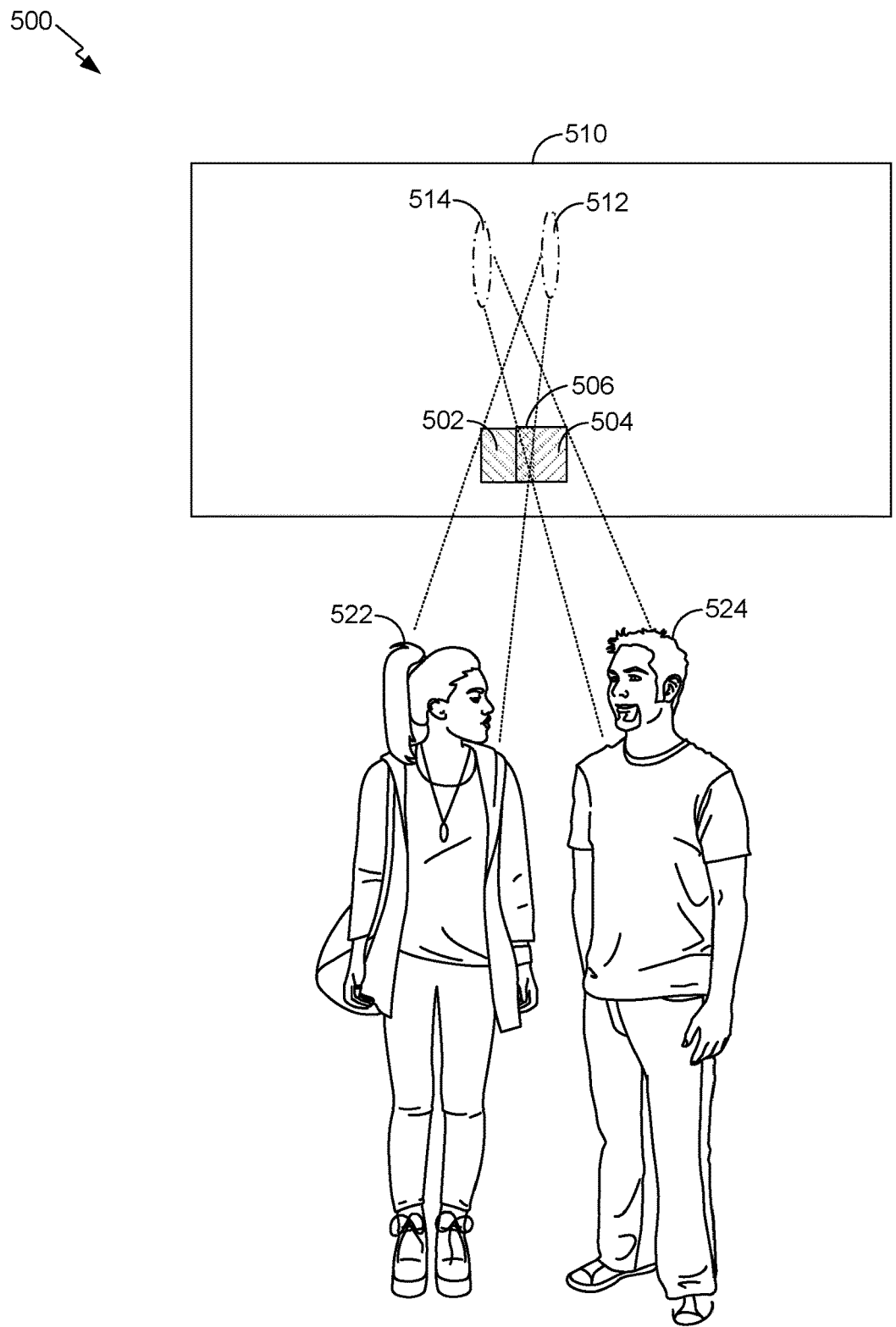
FIG. 5 illustrates an example system comprising an autonomous vehicle and two or more external observers with overlapping fields of view, according to this disclosure.

FIG. 5 illustrates an example system 500 in which the focused projections of multiple virtual models to multiple external observers may overlap. For example, a portion of the autonomous vehicle 110, such as a windshield 510 is shown. In this example, two virtual models 512 and 514 are shown to be generated for communicating with two external observers 522 and 524, respectively. The virtual models 512 and 514 may be generated, customized, and encrypted for projection to the external observers 522 and 524, as described above. In some examples, the virtual models 512 and 514 may be projected from an internal location, such as a projector located at a driver seat or steering wheel of the autonomous vehicle 110. Although the virtual models 512 and 514 have been separately illustrated, the projections of the virtual models 512 and 514 may have a common origin or source of projection, from the same projector.

At any point between their origin at the projector and the eyes of their intended recipients, the virtual models 512 and 514 may overlap. For instance, the external observers 522 and 524 may be positioned in close proximity such that their fields of view which include the virtual models 512 and 524 may overlap. An instance of this overlap is illustrated at a location which includes the windshield 510 of the autonomous vehicle. The region 502 includes frames of the projection of the virtual model 512 and the region 504 includes frames of the projection of the virtual model 514. The region 506 is shown in FIG. 5 as an overlapping region. The overlap in the region 506 may lead to the possibility of the external observers 522, 524 being able to view projections of frames which are not meant for them. For instance, frames of the virtual model 512 in the overlapping region 506 may be included in the field of view of the external observer 524 even though frames of the virtual model 512 are not intended to be viewed by the external observer 524. Similarly, frames of the virtual model 514 in the overlapping region 506 may be included in the field of view of the external observer 522 even though frames of the virtual model 514 are not intended to be viewed by the external observer 522. The interference from the unintended frames in the overlapping region 506 may lead to poor user experience for the external observers 522, 524. The higher the overlap, the worse the user experience is likely to be. The above problems are exacerbated when more external observers with additional overlapping fields of view and related interferences are introduced in system 500.

Figure 6:
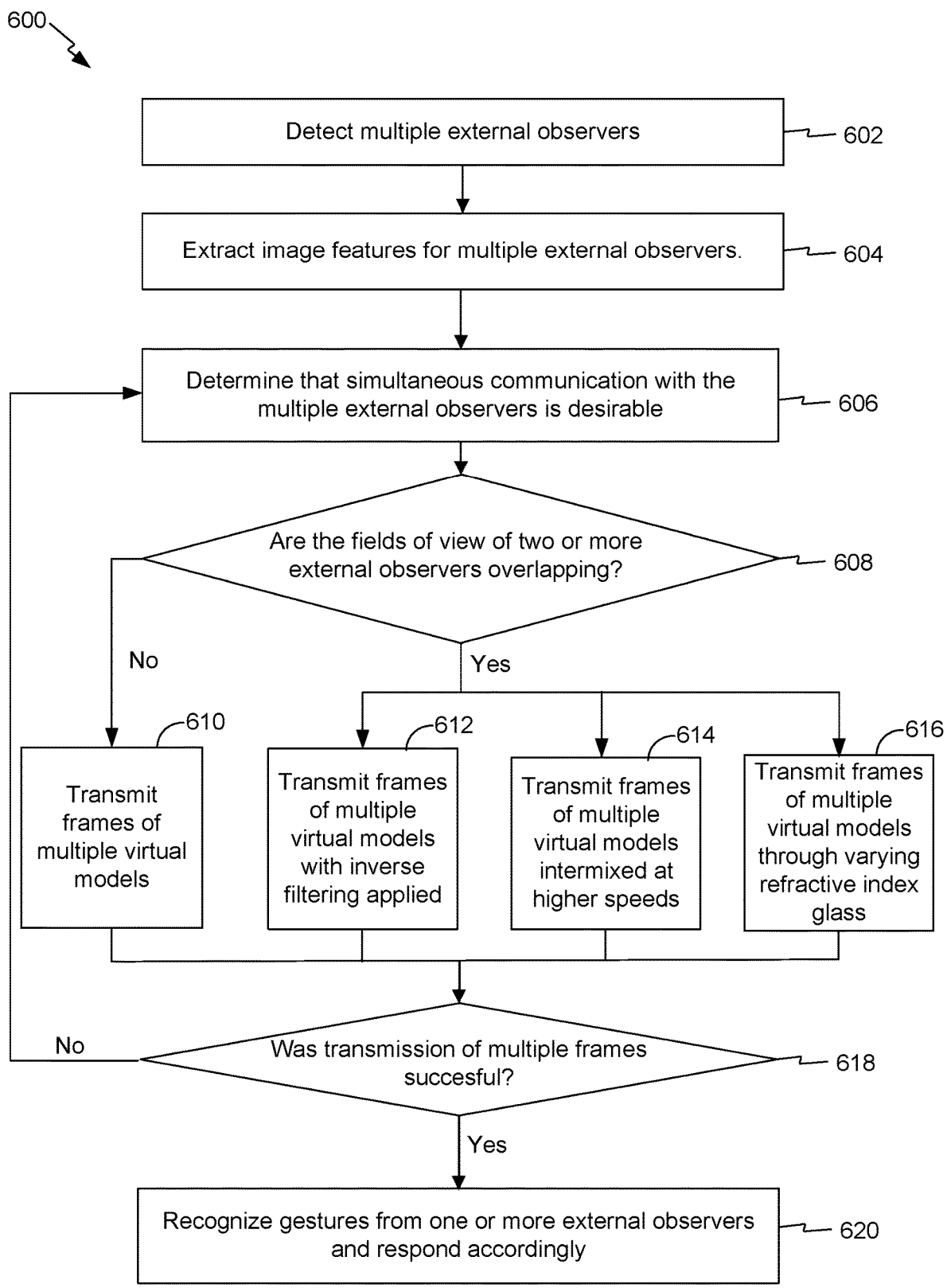
FIG. 6 illustrates an example of a process for preventing interference between multiple virtual models in overlapping fields of views of multiple external observers, according to this disclosure.

FIG. 6 illustrates a process 600 for communication between an autonomous vehicle and one or more external observers. More specifically, the process 600 may pertain to situations in which the fields of view of two or more external observers and/or the projections of two or more virtual models to the two or more external observers may overlap. For example, one or more aspects of the process 600 may be related to the system 500, where the autonomous vehicle may utilize the two or more virtual models 512, 514 for communicating with the two or more external observers 522, 524, and where there may be an overlapping region 506 in the projections of the two or more virtual models 512, 514.

At block 602, the process 600 includes detecting two or more external observers. For example, the previously described process for the block 202 of FIG. 2 may be implemented to detect two or more external observers. For example, the autonomous vehicle 110 may include image sensors (e.g., one or more video cameras, still image cameras, optical sensors, and/or other image capture devices) for capturing images in the vicinity of the autonomous vehicle 110. The autonomous vehicle 110 may utilize RGBD data from the captured images and depth sensors to detect the presence of the two or more external observers 522, 524, for example.

At block 604, process 600 includes extracting image features of the two or more external observers. For example, the autonomous vehicle 110 may implement object recognition algorithms to identify humans such as the external observers 522, 524 in the images captured by the autonomous vehicle at block 602. In some examples, the autonomous vehicle 110 may utilize machine learning techniques (e.g., using one or more neural networks), computer vision techniques, or other techniques for the object recognition, using the RGBD data.

At block 606, process 600 includes determining that simultaneous communication with multiple external observers is desirable. For example, the autonomous vehicle 110 may determine that the two or more external observers 522, 524 are attempting to communicate with the autonomous vehicle 110 using gestures or other inputs. In some examples, object recognition algorithms can be applied to the extracted image features of the detected external observers 522, 524 to determine whether one or more of the detected external observer 522, 524 are directing gestures and/or other visual input toward the autonomous vehicle 110. The gestures (or other input, such as audio) can be used as triggers that are used to trigger processes such as estimating the external observer's pose (pose estimation). In some cases, markers, as previously described, may be used by the autonomous vehicle 110 in conjunction with eye tracking mechanisms to determine that the external observers 122, 124 are looking at the driver seat of the autonomous vehicle with an intent to communicate.

At block 608, process 600 includes determining whether the fields of view of multiple external observers overlap. For example, the autonomous vehicle 110 can determine whether the fields of views of the external observers 522, 524 overlap at a driver seat or a marker, indicating an intent of the external observers 522, 524 to communicate with the autonomous vehicle 110. The autonomous vehicle 110 may implement the processes described with reference to FIG. 4 for tracking the eyes and fields of view of the external observers 522, 524, for example.

Based on the fields of view, and relative positions based on parameters such as depths or distances to the external observers 522, 524, the autonomous vehicle 110 can determine that the fields of view of the external observers 522, 524 overlap and include the overlapping region 506. In some examples, a tracking algorithm can be used to determine whether the fields of view overlap. Any suitable tracking algorithm can be used. In one illustrative example, an optical flow algorithm can be used to track one or more features (e.g., eyes or portion of the eyes, such as one or both irises and/or retinas) indicative of the gaze of an external observer or of multiple external observers (e.g., external observer 522 and external observer 524) who are trying to communicate with the autonomous vehicle 110 (e.g., using a gesture as detected by gesture recognition). Optical flow is described above with respect to FIG. 4. Once one or more eyes are being tracked by the autonomous vehicle 110, the field of view can be determined based on the direction at which the eye(s) are facing relative to the autonomous vehicle 110. As described herein, after recognition is performed, an external observer can be tracked at specific locations in consecutive frames and the motion vectors (e.g., optical flow based motion vectors) associated with the motion of the features of the external observer can be recorded. Analyzing the motion vectors and the location of the recognized features (e.g., one or more eyes) of the external observer, the autonomous vehicle 110 can perform actions such as performing face location detection and projecting frames of a virtual model to the eyes of the external observer.

In some examples, as described herein, foveated rendering can be used to transmit frames of a virtual model (e.g., as beams of light) to an external observer so that the external observer can view the augmented driver. For instance, a 3D augmented reality model can be generated near the steering wheel of the driver seat of the autonomous vehicle 110. The autonomous vehicle 110 can track the eyes of the external observer and can use foveated rendering concepts to determine the field of view of the external observer. As described herein, foveated rendering is a concept in graphics and virtual reality in which one or more eyes (e.g., the retina) of a person are tracked and content is rendered only in the field of view of the eye. The other part of the displayed content may be modified (e.g., may not be sharpened) so that it cannot be accurately viewed by other users. In the above example, based on tracking the eye (e.g., the retina) of the external observer, the resulting field of view, and gesture recognition, the autonomous vehicle 110 can determine whether or not the external observer is trying to communicate with the car.

In the block 608, if the fields of view of the external observers 522, 524 are not determined to be overlapping, the autonomous vehicle 110 may implement one of the above-described processes for transmitting the frames of the virtual models 512, 514 to the external observers 522, 524. For example, the process 600 may proceed to the block 610, wherein a process similar to the processes 300 and/or 400 may be implemented to transmit the frames of the virtual models 512, 514. The frames of the virtual models 512, 514 can be encrypted and decrypted as mentioned above, and can be transmitted using focused beams and foveated rendering in some examples.

In the block 608, if the fields of view of the external observers 522, 524 are determined to be overlapping, the process 600 may proceed to any one or more of the blocks 612, 614, or 616. The processes described in the blocks 612,

614, and 616 may be implemented in any suitable combination with one another as well as with the block 610 in some examples. Thus, in any one or more of the blocks 612, 614, and 616, in addition to the processes performed therein, the frames of the virtual models 512, 514 may be encrypted and decrypted as mentioned above, and transmitted using focused beams and foveated rendering in some examples. The blocks 612, 614, and 616 will now be discussed in further detail.

At block 612, the process 600 implements inverse filtering techniques to prevent the frames of an intended projection in the overlapping region 506 from interference or noise created by frames of unintended projections. For example, applying inverse filtering to the first set of frames of the virtual model 512 can counter or cancel out the interference which may result from the overlap of the second set of frames of the virtual model 514 in the overlapping region 506. Similarly, applying inverse filtering to the second set of frames of the virtual model 514 can counter or cancel out the interference which may result from the overlap of the first set of frames of the virtual model 512 in the overlapping region 506. This way, both of the external observers 522, 524 may view their intended sets of frames from respective virtual models 512, 514 without the undesirable interference in the overlapping region 506. The inverse filtering techniques are discussed further below.

In aspects of inverse filtering an original signal, if an original filter is applied to the original signal, an inverse filter is one that causes the sequence of applying the original filter followed by the inverse filter to result in the original signal. Thus, in the example of applying inverse filtering techniques in example aspects, an original image filter may be applied to the first set of frames which are transmitted for the virtual model 512. Even if images or portions thereof in the first set of frames are overlapped with other images (e.g., from the second set of frames), the images of the first set of frames containing the virtual model 512 may be retrieved by applying appropriate inverse filters to the first set of frames which were filtered with the original filter. Similarly, the second set of frames may also be filtered and then subjected to inverse filtering to retrieve the images of second set of frames containing the virtual model 514 without the overlapping images in the overlapping region 506.

In some aspects, the original filter for the frames of a virtual model may be based on characteristics of the respective external observers encoded in their respective metadata. For example, the face IDs of the external observers 522, 524 may be used to encrypt the frames of the respective virtual models 512, 514. In some examples, the face IDs of the external observers 522, 524 may be included in the metadata of the frames of the virtual models 512, 514. The encrypted frames of the virtual models 512, 514 may be projected towards the fields of view of the external observers 522, 524. Since the virtual models 512, 514 may be generated based on being customized for the different external observers 522, 524 (e.g., based on their face IDs, or one or more other characteristics and/or traits), the frames of the virtual models 512, 514 may be different and distinguishable. The autonomous vehicle 110 may also customize the virtual models 512, 514 based on other attributes such as hair color, clothing colors, or other external appearances of the external observers 522, 524 to add additional distinguishing aspects to the virtual models 512, 514.

In one aspect, the original filter may be a frequency mode filter. In the frequency domain, computations involved in filtering, such as Fourier transforms and vector/matrix multiplications for performing convolutions are more efficient. The respective inverse filters for the original filters may be based in the frequency domain to enable the original frames to be retrieved when the inverse filters are applied to the original filters. The inverse filters may also be based on the face IDs or other distinguishing features used in the original filter. Since the inverse filters for the two external observers 522, 524 are unique and based on their respective original filters, the inverse filtered frames of the respective virtual models 512, 514 are also distinguishable, even in the overlapping region 506.

At block 614, the process 600 includes transmitting frames of the multiple virtual models intermixed together at higher speeds. For instance, the intermixed frames can be projected at a higher speed (e.g., double or triple the speed) than perceivable by the external observers 522, 524. In one illustrative example, the first set of frames for the virtual model 512 and the second set of frames for the virtual model 514 can be sampled at 30 frames per second (fps) each and can be interspersed with one another. The combination of the frames from the first and second sets may be projected at double the speed of the sampled frame rate (e.g., at 60 fps using the 30 fps sample rate). The external observers 522, 524 may each be able to view frames at 30 fps. In the overlapping region 506, there would at most be an image from one set of frames at each time instance because the first and second sets of frames are intermixed.

Each of the first and second set of frames may be encrypted based on the image features of their intended recipients (e.g., encrypting the frames using the respective face IDs of the external observers 522, 524 and/or including the face IDs in the metadata of the corresponding first and second sets of frames). Each of the two sets of frames may be decrypted based on the respective face IDs of the external observers 522, 524. For example, the autonomous vehicle 110 can match the extracted image features of the face IDs to the metadata of the frames being transmitted, and can send the image frames to the external observers 522, 524 using the foveated rendering and projection mode describe above. The external observers 522, 524 may each be able to view the frames that are decrypted based on their respective face IDs at the 30 fps speed.

At block 616, the process 600 includes transmitting frames of the multiple virtual models through a medium or material with variable refractive index. In some examples, the medium may be a glass structure with variable refractive index. For example, the autonomous vehicle 110 can cause the refractive index of a surface such as the windshield 510 to be varied in a manner that selectively allows the first set of frames of the virtual model 512 to pass through the surface so that the first set of frames are visible to the external observer 522 in the overlapping region 506 while blocking the first set of frames from being visible to the external observer 524 (e.g., by blocking the first set of frames from the field of view of the external observer 524). Similarly, the autonomous vehicle 110 can cause the refractive index of the windshield 510 to be varied in a manner that selectively allows the second set of frames of the virtual model 514 to pass through for the external observer 524 in the overlapping region 506 while blocking the second set of frames from the field of view of the external observer 522.

The refractive index of a medium such as glass varies based on density of the medium. The refractive index refers to the speed of light that passes through a medium, which determines how much light is reflected and how much light is refracted. The higher the refractive index of the material, the slower the light travels through the material. A high refractive index causes opaqueness. In an opaque material the refracted light is absorbed and very little to no light passes through, depending on how high the refractive index or opaqueness is. In some examples, the density of the glass surface may be modified by stacking one or more glass planes in a region to modify the density of the region. Thus, the more glass panels stacked back to back, the higher is the density, and thus opaqueness of the region. An example implementation of modifying the density of a material is described below with respect to FIG. 7.

Figure 7:
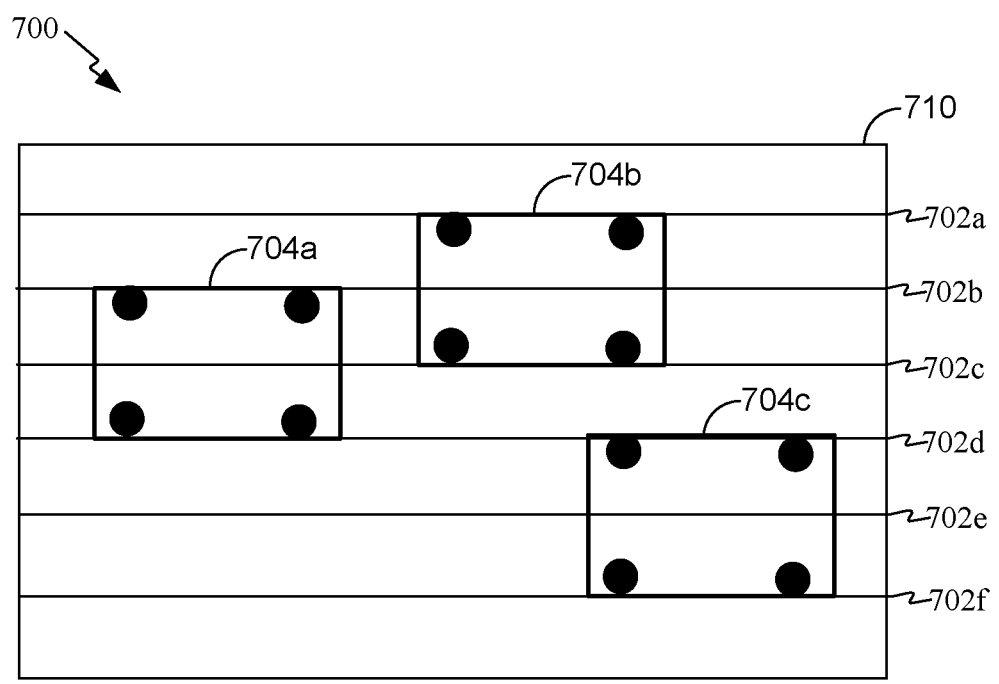
FIG. 7 illustrates an example system for modifying a refractive index of a glass surface, according to this disclosure.

FIG. 7 illustrates a system 700 for modifying refractive index using glass panels. In system 700, a material 710 is shown, which may include the windshield 510, in some examples. Several tracks are shown in a horizontal direction, including track 702a, track 702b, track 702c, track 702d, track 702e, and track 702f. One or more glass panels 704a, 704b, and 704c may slide on the tracks 702a-f using wheels that may be controlled using servomotors or other actuators which may be controllable by the autonomous vehicle (e.g., wirelessly or using a wired connection between a processor and the actuator(s)). Although only three glass panels 704a-c are shown, a larger or smaller number of such glass panels may be utilized in some examples. The glass panels 704a-c may be transparent, and a single one of the glass panels 704a-c on a surface may not increase the density of the underlying surface sufficiently to cause a significant modification in the refractive index. Thus, in any arrangement of the glass panels 704a-c where multiple glass panels 704a-c are not stacked, the underlying surface may have a transparency similar to a conventional windshield. Although the tracks 702a-f are shown in the horizontal direction, various other similar tracks may also be included to allow movement of the glass panels 704a-c in other directions in addition to or as an alternative to the horizontal direction (e.g., in a vertical direction, in a diagonal direction, and/or other direction). By controlling the movement of the various glass panels 704a-c, one or more glass panels 704a-c (e.g., two or more glass panels 704a-c to significantly increase density) may be added to a specific region of the material 710. In one example, two or more of the glass panels 704a-c may be moved to the overlapping region 506 of FIG. 5 to control the opaqueness of the overlapping region 506.

Stacking more than one of the glass panels 704a-c back to back in the overlapping region 506 can increase the density of the overlapping region 506, and can thus increase the refractive index of the overlapping region 506. The refractive index of the overlapping region 506 can be calculated for different combinations and numbers of the glass panels 704a-c stacked in the overlapping region 506. Index of refraction refers to the speed of light in a material, and is relevant when determining how much light is reflected versus how much light is refracted in a material. The higher the refractive index for a material, the slower the light will travel through that material. High refractive index causes opaqueness, in which case light is absorbed in an opaque material. The refractive index n of a material can be calculated as n=c/v; where c is the speed of light in a vacuum and v is the phase velocity of light in the medium. The index of refraction is thus the relation between the speed of light in a vacuum and the speed of light in a substance. The sliding glass panels described above can be used to stack the glass surfaces below the windshield 510 of the autonomous vehicle 110. Adding glass panels will increase the density and will thus increase the refractive index of the windshield 510. The refractive index of the overlapping region 506 using different numbers of glass panels can be calculated by deriving the speed of light in a vacuum checking the speed of light in the overlapping region 506. For example, the speed of light can be calculated after the light is transmitted through the glass panels. The refractive index of the medium can be calculated and correlated to the calculated speed of light values to determine a refractive index that allows content to be hidden in the overlapping region 506.

In an example, the first set of frames of the virtual model 512 may be allowed to pass through the overlapping region 506 by making the overlapping region 506 transparent or have a very low refractive index when the first set of frames are being transmitted to the external observer 522. The very low refractive index or transparency in the overlapping region 506 may be achieved based on not stacking any of the glass panels 704a-c in the overlapping region 506. The second set of frames may be blocked in the overlapping region 506 from being transmitted to the external observer 522 by making the overlapping region 506 opaque. The overlapping region 506 may be made opaque by stacking a predetermined number of the glass panels 504a-c on the overlapping region 506. In some examples, the first set of frames and the second set of frames may be intermixed as described in the block 614, and thus, the first set of frames may be allowed to pass through to the external observer 522 while intermittently blocking the second set of frames using the above-described system 700 for moving the glass panels 504a-c and controlling the refractive index of the overlapping region 506.

In some examples, both the first and second sets of frames in the overlapping region 506 may be hidden from both the external observers 522, 524 based on stacking the glass panels 704a-c to make the overlapping region 506 opaque. The first and second sets of frames may be resampled in the non-overlapping regions 502 and 504.

Returning to FIG. 6, the process 600 proceeds to the block 618 from any one of the blocks 610, 612, 614 and/or 616. At block 618, the process 600 determines whether the frames of the multiple virtual models were successfully transmitted to their intended recipients. For example, the autonomous vehicle 110 may confirm that the multiple virtual models 512, 514 were transmitted using the one or more above-described processes. The autonomous vehicle 110 may also determine whether the intended recipients such as the external observers 522, 524 reacted as expected. For example, the autonomous vehicle 110 may perform object detection and/or object recognition on images of the external observers 522, 524 to determine actions taken by the external observers 522, 524 after the frames were transmitted. If the actions include one or more expected reactions to the messages conveyed by the virtual models 512, 514, the autonomous vehicle 110 may determine that the frames were successfully transmitted and received. In an illustrative example, the virtual model 512 may communicate to the external observer 522 to stop and the external observer 522 may stop as expected. The actions/reactions from the external observers 522, 524 may also be compared with a database of expected reactions, where the database can be trained using neural networks or other learning models. For example, a neural network can be trained to detect the success of transmission of frames if external observers react by stopping to a message which conveys to the external observers that they are to stop.

At the block 618, if the multiple frames were not successfully projected, the process 600 may return to the block 606. Otherwise, the process 600 may proceed to the block 620. At block 620, the process 600 may include recognizing one or more gestures from one or more external observers. For example, one or more external observer 522, 524 may communicate one or more gestures based on or in response to the virtual models 512, 514 being viewed by them. The autonomous vehicle 110 may recognize these one or more gestures and respond appropriately. For example, the autonomous vehicle 110 may modify one or more of the virtual models 512, 514 to provide a response to the gestures or take other action, such as stopping the autonomous vehicle 110.

In some aspects, one or more external observers may have devices (e.g., head mounted displays (HMDs), virtual reality (VR) or augmented reality (AR) glasses, etc.) on their person for viewing images received from an autonomous vehicle.

Communication between the autonomous vehicle and one or more external observers may involve establishing, by the device of an external observer, a connection between the device and the autonomous vehicle, and receiving, by the device, a virtual model of a virtual driver from the autonomous vehicle. Using the device, the external observer may communicate with the virtual model displayed by the autonomous vehicle.

Figure 8:
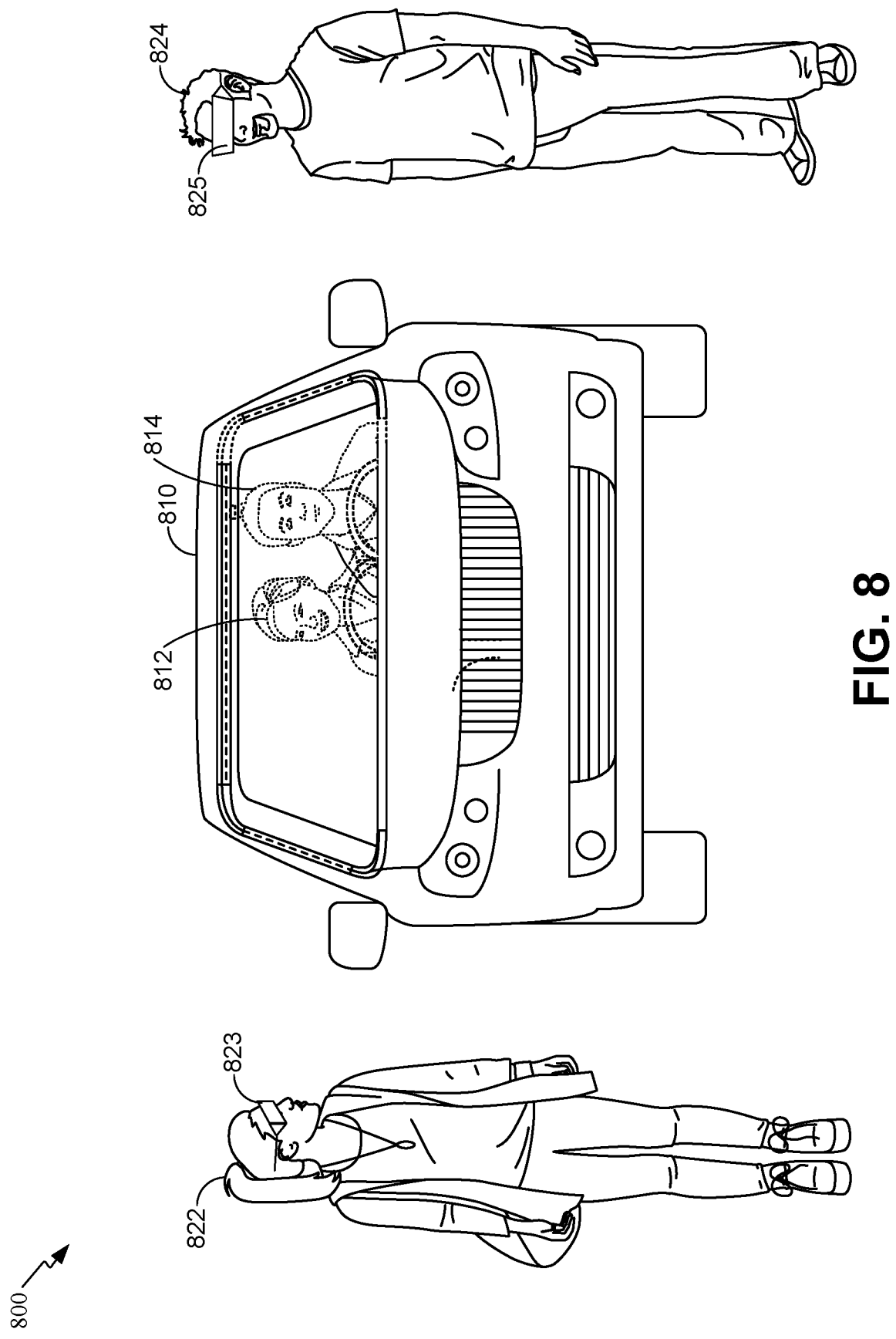
FIG. 8 illustrates an example system comprising an autonomous vehicle and one or more external observers with head mounted displays, according to this disclosure.

FIG. 8 is a schematic illustration of system 800 including the autonomous vehicle 810 shown in proximity to the external observers 822 and 824. A device 823 is shown on the person of the external observer 822 and the device 825 is shown on the person of the external observer 824. The devices 823 and 825 may be configured to, among other possible functions, communicate with the autonomous vehicle 810, receive images from and display the virtual models 812 and 814, respectively, for viewing by and interacting with the respective external observers 822 and 824.

In some examples, the autonomous vehicle 810 can detect the external observers 822, 824 and can determine if one or more of the external observers 822, 824 are attempting to communicate with the autonomous vehicle 810, as described above. The autonomous vehicle 810 can initiate discovery processes for establishing respective connections with (or "pair with") the devices 823, 825 upon detecting that the external observers 822, 824 have the devices 823, 825 on their person. The autonomous vehicle 810 can then generate the virtual models 812, 814 (e.g., 3D augmented reality holograms of drivers of the autonomous vehicle 810) and can transmit the virtual models 812, 814 to the respective devices 823, 825. The transmission may be performed wirelessly or over-the-air using interfaces or communication media, such as cellular (e.g., 4G, 5G, etc.), Wi-Fi, Bluetooth, etc. The devices 823, 825 can receive frames of the virtual models 812, 814. Once the frames are received, the devices 823, 825 can decode (or decompress) and/or decrypt (if encryption was used) the received frames of the virtual models 812, 814 through the respective connections and reconstruct, render, and/or display the frames for the respective external observers 822, 824. The external observers 822, 824 can view and interact with the autonomous vehicle 810 through the virtual models 812, 814, using gestures and/or other input.

In some cases, the one or more external observers 822, 824 may also initiate communication with the autonomous vehicle 810. For example, upon receiving and accepting a pairing request from the autonomous vehicle 810, credentials of the autonomous vehicle 810 may be validated. The external observers 822, 824 may then receive frames of the virtual models 812, 814 through the paired connections as discussed above.

Figure 9A:
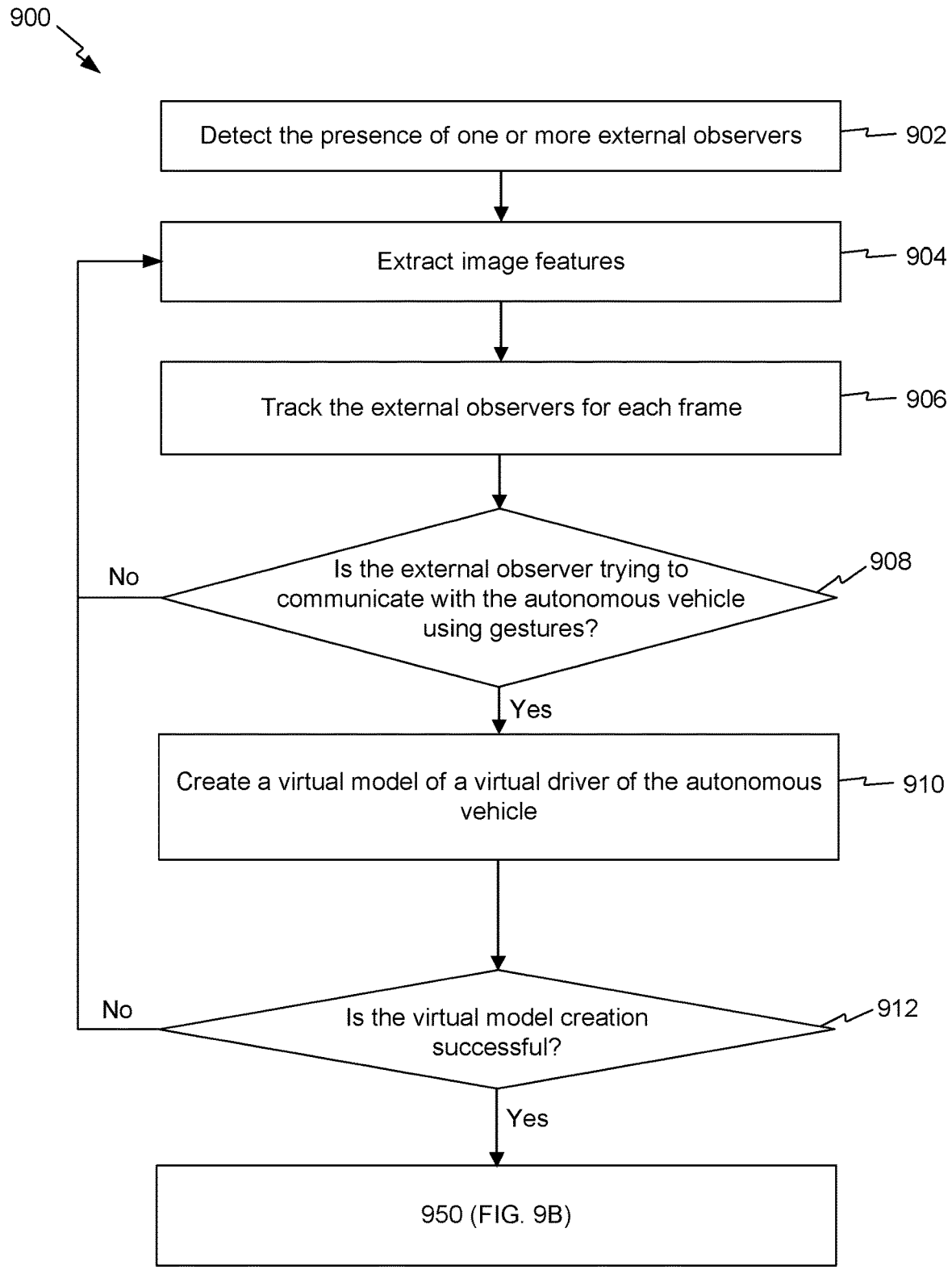
FIG. 9A-FIG. 9B illustrate example processes for interactions between an autonomous vehicle and one or more external observers with head mounted displays, according to this disclosure.
Figure 9B:
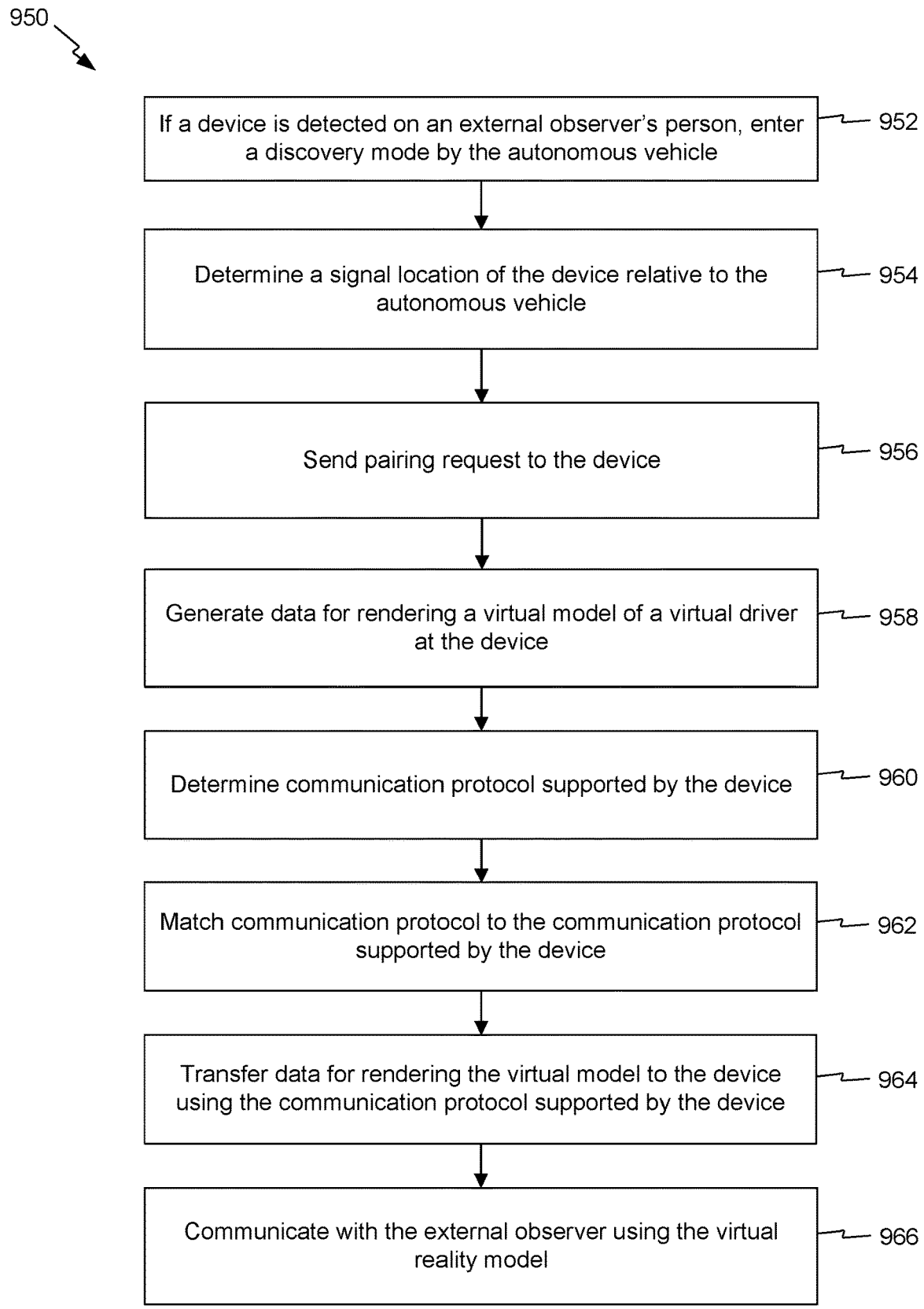

FIG. 9A-FIG. 9B illustrate processes 900, 950 for communication between an autonomous vehicle (e.g., the autonomous vehicle 810) and one or more external observ-ers (e.g., the external observers 822, 824) using respective one or more devices (e.g., the devices 823, 825) associated with the one or more external observers. The process 900 may be similar to the above-described processes in some aspects, and may be performed in conjunction with the process 950 in some examples. The process 900 can be performed to detect whether there are any external observers to communicate with gestures, regardless of whether or not the external observers are equipped with the devices (such as HMDs, VR or AR glasses, or other device) discussed with reference to FIG. 8. The process 950 can be performed to communicate with one or more external observers who may be equipped with the devices discussed with reference to FIG. 8. Although shown in sequence according to one example in FIG. 9A-FIG. 9B, the processes 900 and 950 need not be performed in a sequential order. In some examples, the processes 900 and 950 may be performed independently and in any order or sequence.

The process 900 of FIG. 9A can include capturing or obtaining images of a scene surrounding the autonomous vehicle. For example, the autonomous vehicle 810 may use image sensors and/or other mechanisms to capture the images. At block 902, the process includes detecting the presence of one or more external observers 822, 824 using the captured images, similar to the block 202 of FIG. 2. At block 904, the process 900 includes extracting image features from the images of the one or more external observers. For instance, the autonomous vehicle 810 can extract image features of the external observers 822, 824 similar to the block 204 of FIG. 2. Based on the image features, the autonomous vehicle 810 can identify the external observers 822, 824 in the images as humans.

At block 906, the process 900 includes tracking the one or more detected external observers. For example, the autonomous vehicle 810 can track the one or more external observers 822, 824, such as on a frame-by-frame basis. At block 908, the process 900 includes determining from the tracking whether the one or more external observers are trying to communicate with the autonomous vehicle using gestures and/or other inputs. For example, the autonomous vehicle 810 may implement processes similar to the block 206 of FIG. 2 to determine whether the one or more external observers 822, 824 are trying to communicate with the autonomous vehicle 810 using gestures and/or other inputs. If the one or more external observers 822, 824 are not trying to communicate with the autonomous vehicle 810 using gestures and/or other inputs, then the blocks 904-906 are repeated. If it is determined that the one or more external observers 822, 824 are attempting to communicate with the autonomous vehicle 810 using gestures and/or other inputs, the process 900 proceeds to block 910.

At block 910, the process 900 includes creating one or more virtual models 812, 814 for communicating with the one or more detected external observers 822, 824. For example, the autonomous vehicle 810 may implement processes similar to the block 210 of FIG. 2. In some examples, the characteristics of the one or more external observers (e.g., their face IDs) trying to communicate with the autonomous vehicle 810 may be detected and the characteristics may be used to encrypt the virtual models 812, 814.

At block 912, the process 900 includes determining whether the creation of the one or more virtual models was successful, and if not, blocks 904-910 are repeated. If it is determined that the one or more virtual models were successfully created, the process 900 proceeds to process 950 of FIG. 9B according to some examples. In some examples, the process 950 may be independent of the process 900 as noted above, and the above-mentioned blocks of the process 900 need not be performed in order for the process 950 to be performed.

According to FIG. 9B, at block 952, the process 950 includes detecting by the autonomous vehicle, a device on an external observer's person. For example, the autonomous vehicle 810 may detect one or more devices 823, 825 in proximity to or attached to or worn by the one or more external observers 822, 824. For example, the devices may be head mounted display (HMD), virtual reality (VR) or augmented reality (AR) glasses, or other type of device. If one or more such devices are detected, the autonomous vehicle 810 can enter a discovery mode to connect with the one or more devices over a wireless connection (e.g., Bluetooth, WiFi, cellular, or other wireless connection).

At block 954, the process 950 includes determining a signal location of the detected one or more devices relative to the autonomous vehicle. For example, the signal location of a device 823 may be detected based on discovery signals transmitted by the device 823. Determining the signal location of the device 823 can enable the autonomous vehicle 810 to direct communications, such as pairing requests, to the device 823. The distance and relative direction between the device 823 and the autonomous vehicle 810 can also be determined (e.g., using depth sensors), which can also help in refining the identification of the signal location and direction of the signal location relative to the autonomous vehicle 810. Extracting image features, such as facial attributes of the external observer 822 wearing the device 823 may also reveal the location of the device 823 on the person of the external observer 822, in some examples.

At block 956, the process 950 includes sending a pairing request to the device. For example, the autonomous vehicle 810 may send a pairing request to the device 823. The pairing request may pertain to establishing a communication link, such as through a wireless communication protocol, with the device 823. Once the pairing request has been received, the device 823 may accept or reject the pairing request. The device 823 may verify the credentials of the autonomous vehicle 810 to aid in decisions for accepting or rejecting the pairing request.

At block 958, the process 950 includes generating the data that may be used by the device for rendering a virtual model of a virtual driver. For example, the autonomous vehicle 810 can generate the frames that may be used by the device 823 for rendering the virtual model 812 in the device 823. The autonomous vehicle 810 may transfer the data to the device 823 to cause the device 823 to render the virtual model 812. In some examples, the data transfer may be initiated upon acceptance of the pairing request by the device 823. In some examples, the data transfer may be performed through the use of a communication protocol supported by the device 823.

At block 960, the process 950 includes determining the one or more communication protocols that the device may support. In some examples, the autonomous vehicle 810 can request the device 823 to provide information regarding the communication protocols that the device 823 supports. In some examples, the autonomous vehicle 810 may include this request for information on the communication protocols that the device 823 supports, along with the pairing request which was sent in block 956. Based on the response from the device to the request for information, the autonomous vehicle 810 can determine the one or more communication protocols that the device 823 supports. These communication protocols may be wireless communication protocols (e.g., Wi-Fi, Bluetooth, or other wireless communication protocol), over the air protocols, one or more cellular communication protocols (e.g., 4G, 5G, or other cellular communication protocol), and/or other communication protocol.

At block 962, the process 950 includes matching the communication protocol to be used by the autonomous vehicle for data transfer to the one or more communication protocols supported by the device. For instance, the autonomous vehicle 810 may use the same over the air protocol that the device 823 supports for transferring data and performing further communication with the device 823.

At block 964, the process 950 includes transmitting the data for rendering the virtual model to the device, using one or more communication protocols supported by the device. For example, the autonomous vehicle 810 can transmit data using a communication protocol supported by the device 823 to enable the device 823 to render the virtual model using the data. For instance, the device 823 may decode and extract information from the received data and perform 3D rendering to reconstruct the virtual model 812, such as using homography.

At block 966, the process 950 includes communicating with the external observer using the virtual model rendered or displayed by the device. For example, the autonomous vehicle 810 may communicate with the external observer 822 using the virtual model 812 rendered or displayed by the device 823. The external observer 822 may interpret the virtual model 812 rendered by the device 823 and communicate with the autonomous vehicle 810 using gestures or take action based on gestures conveyed by the virtual model 812.

Figure 10A:
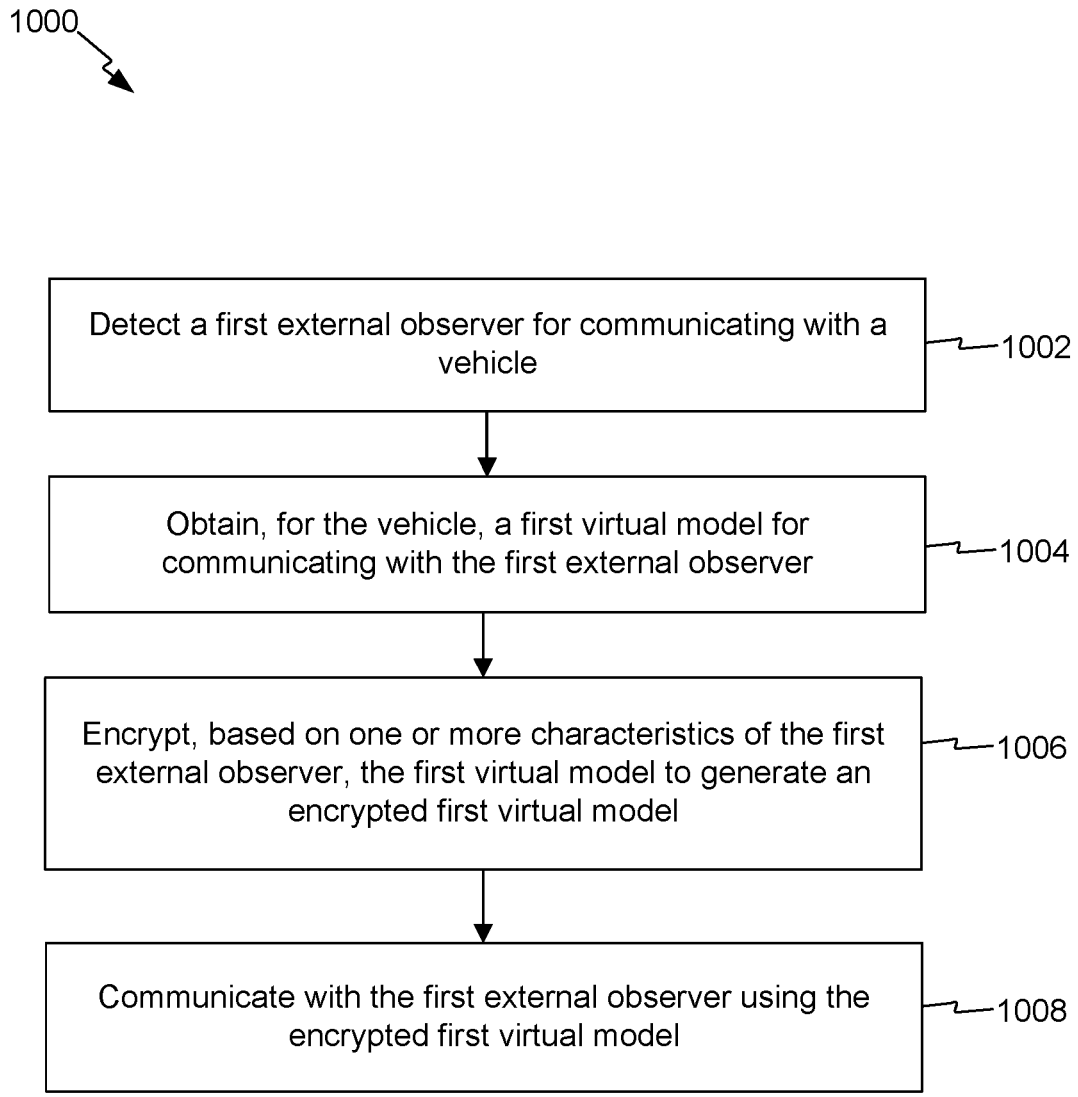
FIG. 10A and FIG. 10B illustrate examples of processes for providing communication between an autonomous vehicle and one or more external observers to implement techniques described in this disclosure.

FIG. 10A is a flowchart illustrating an example of a process 1000 of communication between one or more vehicles (e.g., an autonomous vehicle) and one or more external observers using the techniques described herein. At block 1002, the process 1000 includes detecting a first external observer for communicating with a vehicle (e.g., an autonomous vehicle). In some examples, the process 1000 can identify an input associated with the first external observer and can detect, based on the input, that the first external observer is attempting to communicate with the vehicle. The input can include one or more gestures, one or more audible inputs (e.g., a voice command), and/or any other type of input.

In one illustrative example, the autonomous vehicle 110 can detect the first and second external observers 122, 124, respectively for potential communication with the autonomous vehicle 110. In some examples, the autonomous vehicle 110 can include image sensors (e.g., one or more video cameras, still image cameras, optical sensors, and/or other image capture devices) for capturing images in the vicinity of the autonomous vehicle 110. In some examples, the autonomous vehicle may also use other types of sensors such as a radar which uses radio waves to detect the presence, range, velocity, etc., of objects in the vicinity of the autonomous vehicle 110. Any other type of motion detection mechanism may also be employed in some examples to detect moving objects in the vicinity of the autonomous vehicle 110. The vicinity of the autonomous vehicle 110 may include areas surrounding the autonomous vehicle 110, including the front, back, and sides. In some examples, the autonomous vehicle 110 may employ detection mechanisms which are particularly focused on a direction of travel of the autonomous vehicle 110 (e.g., towards the front and the back, depending if the autonomous vehicle 110 is moving forwards or in a reverse direction).

At block 1004, the process 1000 includes obtaining, for the vehicle, a first virtual model for communicating with the first external observer. In some cases, the first virtual model can be generated by the vehicle. In some cases, the first virtual model can be generated by a server and the vehicle can receive the first virtual model from the server. At block 1006, the process 1000 includes encrypting, based on one or more characteristics of the first external observer, the first virtual model to generate an encrypted first virtual model. For example, the virtual models 112, 114 may be generated for communicating with the detected external observers 122, 124. In some examples, the virtual models 112, 114 can initiate communication with the one or more detected external observers using gestures or other interactive output (e.g., an audible message).

In some examples, the virtual models 112, 114 may be customized for interacting with the external observers 122, 124. The customization of the virtual models 112, 114 can be based on one or more traits or characteristics of the external observers 122, 124 in some cases. A customized virtual model can have customized body language, customized gestures, customized appearance, among other customized features that are based on characteristics of the external observer. For example, the virtual models 112, 114 can be customized to interact with external observers 122, 124 based on their respective characteristics (e.g., the ethnicity, appearance, actions, age, etc.). In some cases, the object recognition algorithm for feature extraction in block 204, for example, may further extract features to detect characteristics such as the ethnicity of the external observer, which may be used in customizing the virtual models 112, 114 generated for the respective external observers 122, 124. For instance, the virtual models 112, 114 may be created to match the respective ethnicities of the external observers 122, 124. This may enhance the quality of communication based on ethnicity-specific gestures, for example.

In some implementations, the customized virtual models may be generated from previously learned models based on neural networks, such as in real time with cloud-based pattern matching. For example, the neural networks used to generate the virtual models may be continually retrained as more sample data is acquired.

Some example methods of communication between a vehicle and external observers according to this disclosure may include the use of encryption techniques. In some examples, the encryption techniques may be employed in situations where multiple external observers are present, and where simultaneous multiple virtual models are generated and used for interactions with the multiple external observers For example, upon detecting two or more external observers 122, 124 for communicating with the autonomous vehicle 110, the autonomous vehicle 110 may utilize encryption techniques to ensure that a particular virtual model 112 can be viewed only by a specific external observer 122 who is an intended recipient, but not by other external observers such as the external observer 124. Similarly, encryption techniques may be used to ensure that the virtual model 114 can be viewed only by the external observer 124 who is an intended recipient, but not by other external observers such as the external observer 122.

In some examples, an encryption technique may be based on extracting one or more image features of an external observer. For example, a face image, iris, and/or other representative features or portions of the external observer 122 may be obtained from the one or more image sensors of the autonomous vehicle 110. In some examples, the representative features or portions of the external observer 122 may include the face ID of the external observer 122. The autonomous vehicle 110 may encrypt the virtual model 112 generated for communication with the external observer 122 using the one or more image features such as the face ID of the external observer 122. For example, the autonomous vehicle 110 may use the face ID as a private key to encrypt one or more frames of the virtual model 112. In some examples, the autonomous vehicle 110 may additionally or alternatively add the face ID to frames of the virtual model 112, e.g., as metadata.

At block 1008, the process 1000 includes communicating with the first external observer using the encrypted first virtual model. In some examples, the encrypted virtual model described above may be used for communicating with the external observer 122.

In some examples, the process 1000 can include detecting a second external observer for communicating with the vehicle. The process 1000 can include obtaining, for the vehicle, a second virtual model for communicating with the second external observer. In some cases, the process 1000 can encrypt, based on one or more characteristics of the second external observer, the second virtual model to generate an encrypted second virtual model. The process 1000 can communicate with the second external observer using the encrypted second virtual model simultaneously with communicating with the first external observer using the encrypted first virtual model.

For example, the process 1000 can project a first set of frames of the encrypted first virtual model towards the first external observer, and can project a second set of frames of the encrypted second virtual model towards the second external observer. The process 1000 can project the first and second set of frames in way that prevent the first set of frames from overlapping the second set of frames. In this way, the autonomous vehicle 110 can ensure that the frames of the virtual model 112 are uniquely associated with the intended external observer 122 with whom the virtual model 112 will be used for communication.

In some implementations, preventing the first set of frames from overlapping the second set of frames can be performed by displaying the first set of frames and the second set of frames on a glass surface with a variable refractive index. The process 1000 can include modifying a refractive index of a first portion of the glass surface to selectively allow the first set of frames to pass through the first portion of the glass surface in a field of view of the first external observer while blocking the second set of frames from passing through the first portion of the glass surface in the field of view of the first external observer. The process 1000 can further include modifying a refractive index of a second portion of the glass surface to selectively allow the second set of frames to pass through the second portion of the glass surface in a field of view of the second external observer while blocking the first set of frames from passing through the second portion of the glass surface in the field of view of the second external observer. An illustrative example of modifying the refractive index of a glass surface (e.g., a windshield) is provided above with respect to FIG. 7.

The autonomous vehicle 110 may decrypt the frames of the virtual model 112 when they are displayed or projected in a field of view of the intended external observer 122. For example, the autonomous vehicle may employ foveated rendering techniques to project the decrypted frames of the virtual model 112 towards the eyes of the external observer 122. The autonomous vehicle 110 may utilize the previously described eye tracking mechanisms to detect the gaze and field of view of the external observer 122. In some aspects, the decryption applied to the frames of the virtual model 112 before the focused projection using foveated rendering ensures that the frames are viewed by the intended external observer 122. The autonomous vehicle 110 may use the image features extracted from the external observer 122 for this decryption. When multiple virtual models 112, 114 are generated and simultaneously projected to multiple external observers 122, 124, the above-described encryption-decryption process ensures that frames of the virtual model 112, which were generated and encrypted using image features of an intended external observer 122, are decrypted using the image features of the intended external observer 122 and projected to the intended external observer 122. In other words, the above-described encryption-decryption process also ensures that frames of the virtual model 112, which were generated and encrypted using image features of an intended external observer 122, are not decrypted using the image features of a different external observer such as the external observer 124, thus preventing the unintended external observer 124 from being able to view the frames of the virtual model 112.

In some examples, the virtual models 112, 114 may be encrypted by the autonomous vehicle 110 in the above-described manner to generate respective encrypted virtual models. In some examples, the virtual models 112, 114 may be encrypted by a server or other remote device (not shown) in communication with the autonomous vehicle 110, and the autonomous vehicle 110 can receive the encrypted virtual models from the server or other remote device. Likewise, in some examples, the encrypted virtual models may be decrypted by the autonomous vehicle 110, to be projected to respective intended external observers 122, 124. In some examples, the encrypted virtual models may be decrypted by a server or other remote device in communication with the autonomous vehicle 110, and the autonomous vehicle 110 can receive the decrypted virtual models from the server or other remote device to be projected to the intended external observers 122, 124.

Figure 10B:
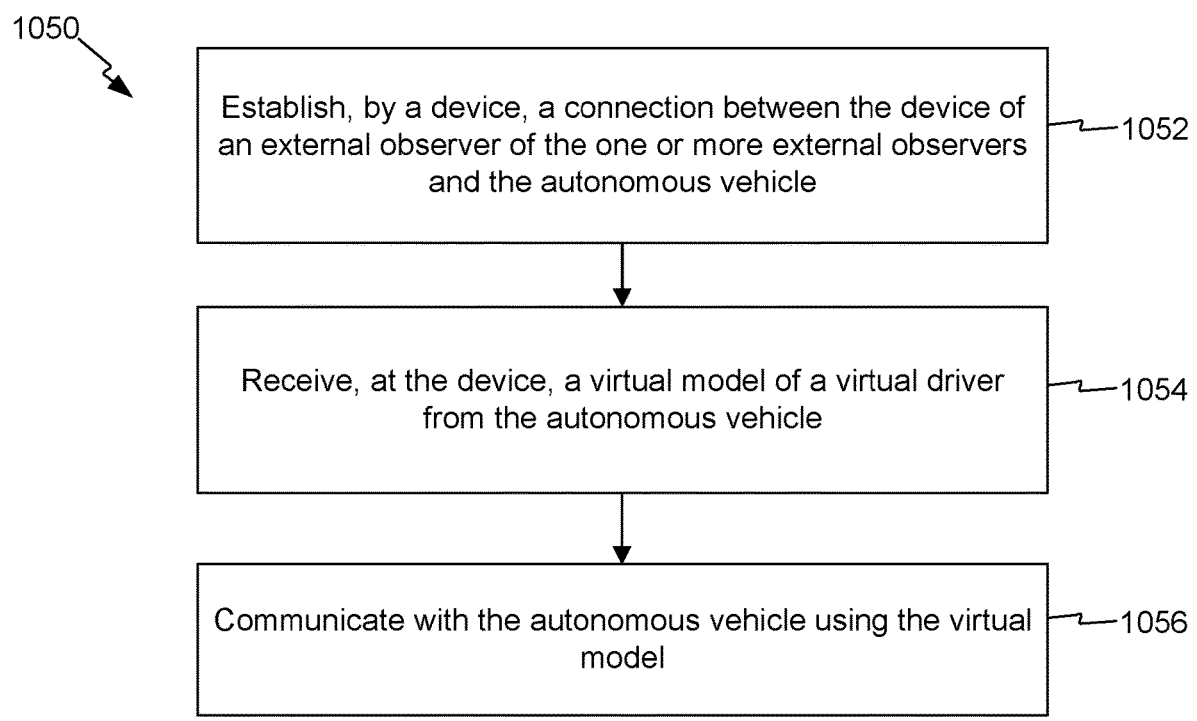

FIG. 10B is a flowchart illustrating an example of a process 1050 of communication between a vehicle (e.g., an autonomous vehicle) and one or more external observers using the techniques described herein.

At block 1052, the process 1050 includes establishing, by a device, a connection between the device of an external observer of the one or more external observers and the vehicle. For example, the autonomous vehicle 810 may detect one or more devices 823, 825 in proximity to or attached to or worn by the one or more external observers 822, 824. For example, the devices may be head mounted display (HMD), virtual reality (VR) glasses, etc. If one or more such devices are detected, the autonomous vehicle 810 may enter a discovery mode to connect with the one or more devices. For example, the autonomous vehicle 810 may send a pairing request to the device 823. The pairing request may pertain to establishing a communication link, such as through a wireless communication protocol, with the device 823. Once the pairing request has been received, the device 823 may accept or reject the pairing request. The device 823 may verify the credentials of the autonomous vehicle 810 to aid in decisions for accepting or rejecting the pairing request.

At block 1054, the process 1050 includes receiving, at the device, a virtual model of a virtual driver from the vehicle. For example, the autonomous vehicle 810 may generate the frames that may be used by the device 823 for rendering the virtual model 812 in the device 823. The autonomous vehicle 810 may transfer this data to the device 823 to cause the device 823 to render the virtual model 812. In some examples, the data transfer may be initiated upon acceptance of the pairing request by the device 823. In some examples, the data transfer may be through the use of a communication protocol supported by the device 823.

At block 1056, the process 1050 includes communicating with the vehicle using the virtual model. For example, the autonomous vehicle 810 may request the device 823 to provide information regarding the communication protocols that the device 823 supports. In some examples, the autonomous vehicle 810 may include this request for information on the communication protocols that the device 823 supports, along with the pairing request which was sent. Based on the response from the device to the request for information, the autonomous vehicle 810 may determine the one or more communication protocols that the device 823 supports. These communication protocols may be wireless communication protocols (e.g., Wi-Fi, Bluetooth), over the air protocols, one or more cellular communication protocols (e.g., 4G, 5G, etc.). The autonomous vehicle 810 may use the same over the air protocol that the device 823 supports for transferring data and performing further communication with the device 823. The autonomous vehicle 810 may transmit data using a communication protocol supported by the device 823 to enable the device 823 to render the virtual model using the data. For instance, the device 823 may decode and extract information from the received data and perform 3D rendering to reconstruct the virtual model 812, e.g., using homography. The autonomous vehicle 810 may communicate with the external observer 822 using the virtual model 812 rendered or displayed by the device 823. The external observer 822 may interpret the virtual model 812 rendered by the device 823 and communicate with the autonomous vehicle 810 using gestures or take action based on gestures conveyed by the virtual model 812.

In some examples, the above-described methods may be performed by a computing device or an apparatus. In one illustrative example, one or more of the processes 200, 300, 400, 600, 900, 950, 1000, and 1050 can be performed by a computing device in a vehicle (e.g., the autonomous vehicle 110 and/or the autonomous vehicle 810). In some cases, the vehicle can include other types of vehicles in some implementations, such as an unmanned aerial vehicle (UAE) (or drone), or other type of vehicle or vessel. In some examples, the computing device may be configured with computing device architecture 1100 shown in FIG. 11. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 200, 300, 400, 600, 900, 950, 1000, and 1050 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

The processes 200, 300, 400, 600, 900, 950, 1000, and 1050 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
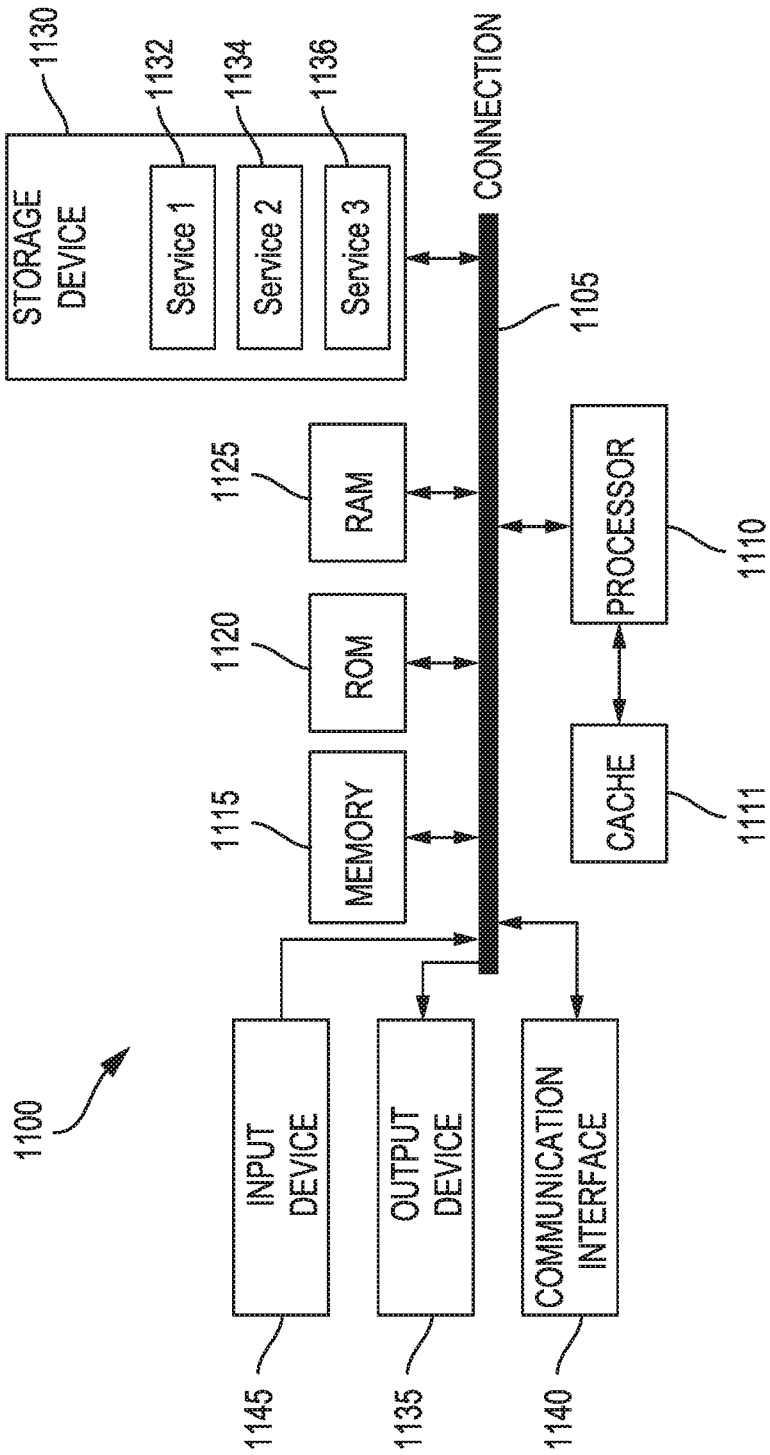
FIG. 11 illustrates an example computing device architecture to implement techniques described in this disclosure.

FIG. 11 illustrates an example computing device architecture 1100 of an example computing device which can implement the various techniques described herein. For example, the computing device architecture 1100 can implement the one or more processes described herein. The components of the computing device architecture 1100 are shown in electrical communication with each other using a connection 1105, such as a bus. The example computing device architecture 1100 includes a processing unit (CPU or processor) 1110 and a computing device connection 1105 that couples various computing device components including a computing device memory 1115, such as a read only memory (ROM) 1120 and a random access memory (RAM) 1125, to the processor 1110.

The computing device architecture 1100 can include a cache of a high-speed memory connected directly with, in close proximity to, or integrated as part of the processor 1110. The computing device architecture 1100 can copy data from the memory 1115 and/or the storage device 1130 to the cache 1112 for quick access by the processor 1110. In this way, the cache 1112 can provide a performance boost that avoids the processor 1110 delays while waiting for data. These and other modules can control or be configured to control the processor 1110 to perform various actions. Other computing device memory 1115 may be available for use as well. The memory 1115 can include multiple different types of memory with different performance characteristics. The processor 1110 can include any general purpose processor and a hardware or software service, such as service 1 1132, service 2 1134, and service 3 1136 stored in the storage device 1130, configured to control the processor 1110 as well as a special-purpose processor where software instructions are incorporated into the processor design. The processor 1110 may be a self-contained system, containing multiple cores or processors, a bus, memory controller, cache, etc. A multi-core processor may be symmetric or asymmetric.

To enable user interaction with the computing device architecture 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art, such as a display, projector, television, speaker device, etc. In some instances, multimodal computing devices can enable a user to provide multiple types of input to communicate with the computing device architecture 1100. The communications interface 1140 can generally govern and manage the user input and computing device output. There is no restriction on operating on any particular hardware arrangement and therefore the basic features here may easily be substituted for improved hardware or firmware arrangements as they are developed.

The storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof. The storage device 1130 can include the services 1132, 1134, 1136 for the controlling processor 1110. Other hardware or software modules are contemplated. The storage device 1130 can be connected to the computing device connection 1105. In one aspect, a hardware module that performs a particular function can include the software component stored in a computer-readable medium in connection with the necessary hardware components, such as the processor 1110, connection 1105, output device 1135, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods and processes according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured to perform one or more of the operations described herein.

What is claimed is:

1. An apparatus for communicating between one or more vehicles and one or more external observers, comprising:
a memory configured to store data; and
a processor configured to:
detect a first external observer for communicating with a vehicle;
obtain, for the vehicle, a first virtual model for communicating with the first external observer;
encrypt, based on one or more characteristics of the first external observer, the first virtual model to generate an encrypted first virtual model; and
communicate with the first external observer using the encrypted first virtual model, wherein a first set of frames of the encrypted first virtual model are visible to the first external observer and are prevented from being visible to one or more other external observers.

2. The apparatus of claim 1, wherein, to communicate with the first external observer using the encrypted first virtual model, the processor is configured to:
decrypting frames of the encrypted first virtual model based on the one or more characteristics of the first external observer; and
projecting the decrypted frames of first virtual model towards the first external observer.

3. The apparatus of claim 2, wherein, to project the decrypted frames of the first virtual model towards the first external observer, the processor is configured to:
detect a field of view of the first external observer; and
project a foveated rendering of the decrypted frames of the first virtual model to the first external observer based on the field of view.

4. The apparatus of claim 1, wherein the processor is further configured to:
detect a second external observer for communicating with the vehicle;
obtain, for the vehicle, a second virtual model for communicating with the second external observer;
encrypt, based on one or more characteristics of the second external observer, the second virtual model to generate an encrypted second virtual model; and
communicate with the second external observer using the encrypted second virtual model simultaneously with communicating with the first external observer using the encrypted first virtual model.

5. The apparatus of claim 4, wherein the processor is further configured to:
project a first set of frames of the encrypted first virtual model towards the first external observer;
project a second set of frames of the encrypted second virtual model towards the second external observer; and
prevent the first set of frames from overlapping the second set of frames.

6. The apparatus of claim 1, wherein the apparatus includes the vehicle.

7. The apparatus of claim 1, wherein the apparatus includes a computing device of the vehicle.

8. A method of communication between one or more vehicles and one or more external observers, the method comprising:
detecting a first external observer for communicating with a vehicle;
obtaining, for the vehicle, a first virtual model for communicating with the first external observer;
encrypting, based on one or more characteristics of the first external observer, the first virtual model to generate an encrypted first virtual model; and
communicating with the first external observer using the encrypted first virtual model, wherein a first set of frames of the encrypted first virtual model are visible to the first external observer and are prevented from being visible to one or more other external observers.

9. The method of claim 8, wherein communicating with the first external observer using the encrypted first virtual model comprises:
decrypting frames of the encrypted first virtual model based on the one or more characteristics of the first external observer; and
projecting the decrypted frames of first virtual model towards the first external observer.

10. The method of claim 9, wherein projecting the decrypted frames of the first virtual model towards the first external observer comprises:
detecting a field of view of the first external observer; and
projecting a foveated rendering of the decrypted frames of the first virtual model to the first external observer based on the field of view.

11. The method of claim 8, further comprising:
detecting a second external observer for communicating with the vehicle;
obtaining, for the vehicle, a second virtual model for communicating with the second external observer;
encrypting, based on one or more characteristics of the second external observer, the second virtual model to generate an encrypted second virtual model; and
communicating with the second external observer using the encrypted second virtual model simultaneously with communicating with the first external observer using the encrypted first virtual model.

12. The method of claim 11, further comprising:
projecting a first set of frames of the encrypted first virtual model towards the first external observer;
projecting a second set of frames of the encrypted second virtual model towards the second external observer; and
preventing the first set of frames from overlapping the second set of frames.

13. A non-transitory computer-readable medium having stored thereon instructions that, when executed by one or more processors, cause the one or more processors to:
detect a first external observer for communicating with a vehicle;
obtain, for the vehicle, a first virtual model for communicating with the first external observer;
encrypt, based on one or more characteristics of the first external observer, the first virtual model to generate an encrypted first virtual model; and
communicate with the first external observer using the encrypted first virtual model, wherein a first set of frames of the encrypted first virtual model are visible to the first external observer and are prevented from being visible to one or more other external observers.

14. An apparatus for communicating between one or more vehicles and one or more external observers, comprising:
means for detecting a first external observer for communicating with a vehicle;
means for obtaining, for the vehicle, a first virtual model for communicating with the first external observer;
means for encrypting, based on one or more characteristics of the first external observer, the first virtual model to generate an encrypted first virtual model; and means for communicating with the first external observer using the encrypted first virtual model, wherein a first set of frames of the encrypted first virtual model are visible to the first external observer and are prevented from being visible to one or more other external observers.

\* \* \* \* \*